(12) United States Patent
Fujimoto et al.

(10) Patent No.: US 11,281,933 B2
(45) Date of Patent: Mar. 22, 2022

(54) INFORMATION PROCESSING DEVICE, MEASUREMENT SYSTEM, AND NON-TRANSITORY STORAGE MEDIUM

(71) Applicants: ARKRAY, Inc., Kyoto (JP); SUMITOMO LIFE WELFARE AND CULTURE FOUNDATION, Osaka (JP)

(72) Inventors: Koji Fujimoto, Kyoto (JP); Shinya Nakajima, Kyoto (JP); Kenichi Nagao, Osaka (JP)

(73) Assignees: ARKRAY, Inc., Kyoto (JP); SUMITOMO LIFE WELFARE AND CULTURE FOUNDATION, Osaka (JP)

( * ) Notice: Subject to any disclaimer, the term of this patent is extended or adjusted under 35 U.S.C. 154(b) by 25 days.

(21) Appl. No.: 16/677,896

(22) Filed: Nov. 8, 2019

(65) Prior Publication Data

US 2020/0160094 A1 May 21, 2020

(30) Foreign Application Priority Data

Nov. 19, 2018 (JP) .............................. JP2018-216665

(51) Int. Cl.
*G06K 9/62* (2006.01)

(52) U.S. Cl.
CPC ........... *G06K 9/6202* (2013.01); *G06K 9/628* (2013.01)

(58) Field of Classification Search
CPC ........... G06K 9/00127; G06K 9/00147; G06K 9/6202; G06K 9/628; G06K 9/0014;
(Continued)

(56) References Cited

U.S. PATENT DOCUMENTS

| 4,612,614 A | 9/1986 | Deindoerfer et al. |
| 5,911,002 A | 6/1999 | Mitsuyama et al. |

(Continued)

FOREIGN PATENT DOCUMENTS

| EP | 0693679 A1 | 1/1996 |
| EP | 3 279 657 A1 | 2/2018 |

(Continued)

OTHER PUBLICATIONS

The extended European search report issued by the European Patent Office dated Apr. 1, 2020, which corresponds to European Patent Application No. 19207547.1-1207 and is related to U.S. Appl. No. 16/677,896.

(Continued)

*Primary Examiner* — Ian L Lemieux
(74) *Attorney, Agent, or Firm* — Studebaker & Brackett PC

(57) ABSTRACT

An information processing device includes a categorizing section and a display control section. The categorizing section extracts a material component image identified as a material component from plural images obtained by imaging a sample fluid containing plural types of material element, and categorizes the extracted material component image serving as a detected component by predetermined category. The display control section performs control to re-categorize a material component image serving as the detected component already categorized into a different category, such that, when selection of a movement destination category is received in a state in which a first image list of detected components is being displayed, in a subsequent state in which the first image list and a second image list for the movement destination are being displayed at the same time, a material component image selected from the first image list is moved to the second image list.

23 Claims, 14 Drawing Sheets

(58) Field of Classification Search
CPC .. G06K 9/3241; G06K 9/4628; G06K 9/6267;
G06K 9/6273; G01N 15/1429; G01N
15/1463; G01N 2015/1465; G01N
2015/1486; G01N 2015/1488; G06N
3/0454; G06N 3/08; G06N 5/046; G06T
2207/20084
See application file for complete search history.

(56) References Cited

U.S. PATENT DOCUMENTS

| | | | | |
|---|---|---|---|---|
| 9,726,584 | B2* | 8/2017 | Yamada | G06T 7/0012 |
| 2005/0251347 | A1* | 11/2005 | Perona | G06K 9/522 |
| | | | | 702/19 |
| 2006/0050948 | A1* | 3/2006 | Sumida | G01N 15/1463 |
| | | | | 382/133 |
| 2006/0159325 | A1* | 7/2006 | Zeineh | G16H 10/20 |
| | | | | 382/128 |
| 2006/0265173 | A1* | 11/2006 | Mishima | G01N 15/147 |
| | | | | 702/118 |
| 2007/0122064 | A1* | 5/2007 | Arima | G06K 9/033 |
| | | | | 382/310 |
| 2009/0191585 | A1* | 7/2009 | Yamada | G06T 7/0012 |
| | | | | 435/34 |
| 2010/0104169 | A1* | 4/2010 | Yamada | G01N 15/1429 |
| | | | | 382/134 |
| 2013/0002847 | A1* | 1/2013 | Zahniser | G06T 7/0012 |
| | | | | 348/79 |
| 2013/0287283 | A1* | 10/2013 | Kamath | G06K 9/0014 |
| | | | | 382/133 |
| 2017/0138845 | A1* | 5/2017 | Birarda | G01N 15/1463 |
| 2017/0140208 | A1* | 5/2017 | Kaufman | G06F 3/04845 |
| 2018/0017480 | A1* | 1/2018 | Fukuda | G01N 33/483 |
| 2018/0322327 | A1 | 11/2018 | Smith et al. | |
| 2020/0005499 | A1* | 1/2020 | Tsuneki | G06N 3/006 |
| 2020/0103333 | A1* | 4/2020 | Tatsutani | G01N 15/1425 |

FOREIGN PATENT DOCUMENTS

| | | |
|---|---|---|
| JP | H06043948 B2 | 6/1994 |
| JP | H11132932 A | 5/1999 |
| JP | H11132933 A | 5/1999 |
| JP | H11132934 A | 5/1999 |
| JP | H11132935 A | 5/1999 |
| JP | H11132936 A | 5/1999 |
| JP | H11132937 A | 5/1999 |
| WO | 9913316 A1 | 3/1999 |
| WO | 9913317 A1 | 3/1999 |
| WO | 2004/113865 A2 | 12/2004 |

OTHER PUBLICATIONS

Communication pursuant to Article 94(3) EPC issued by the European Patent Office dated Jun. 9, 2021, which corresponds to European Patent Application No. 19207547.1-1207 and is related to U.S. Appl. No. 16/677,896.

The extended European search report issued by the European Patent Office dated Jan. 20, 2022, which corresponds to European Patend Application No. 21198954.6.

* cited by examiner

FIG.6

| | | | | | | | | | |
|---|---|---|---|---|---|---|---|---|---|
| | RBC | 23/μL | * | ✓ | WBCC | 1/HPF | ! | RBC | MOVE ALL |
| | WBC | 4/HPF | ! | ✓ | TRIP | 4/HPF | * | WBC | SWITCH DISPLAY |
| ✓ | NSE | 5/HPF | | ✓ | REEP | 5/HPF | * | NSE | VIEW ALL COMPONENT IMAGES |
| ✓ | SQEC | 2++ | | | WAXY | | | SQEC | |
| | NHC | | | | CAOX | | | HYAL | |
| | BACT | 4+ | ↑ | | YST | | | NHC | |
| | CRYS | | ↓ | | | | | BACT | |
| | YST | | | | | | | CRYS | |
| | HYST | | | | | | | YST | |
| | MUCS | | | | | | | HYST | |
| | SPRM | | | | | | | MUCS | |
| | UNCL | | | | | | | SPRM | |
| | DRBC | | | | | | | FAT | |
| | RBCC | | | | | | | TRCH | |
| | | | | | | | | PARA | |
| | | | | | | | | ART | |
| | | | | | | | | UNCL | |

50C  50A  16  50B  50

FIG.10
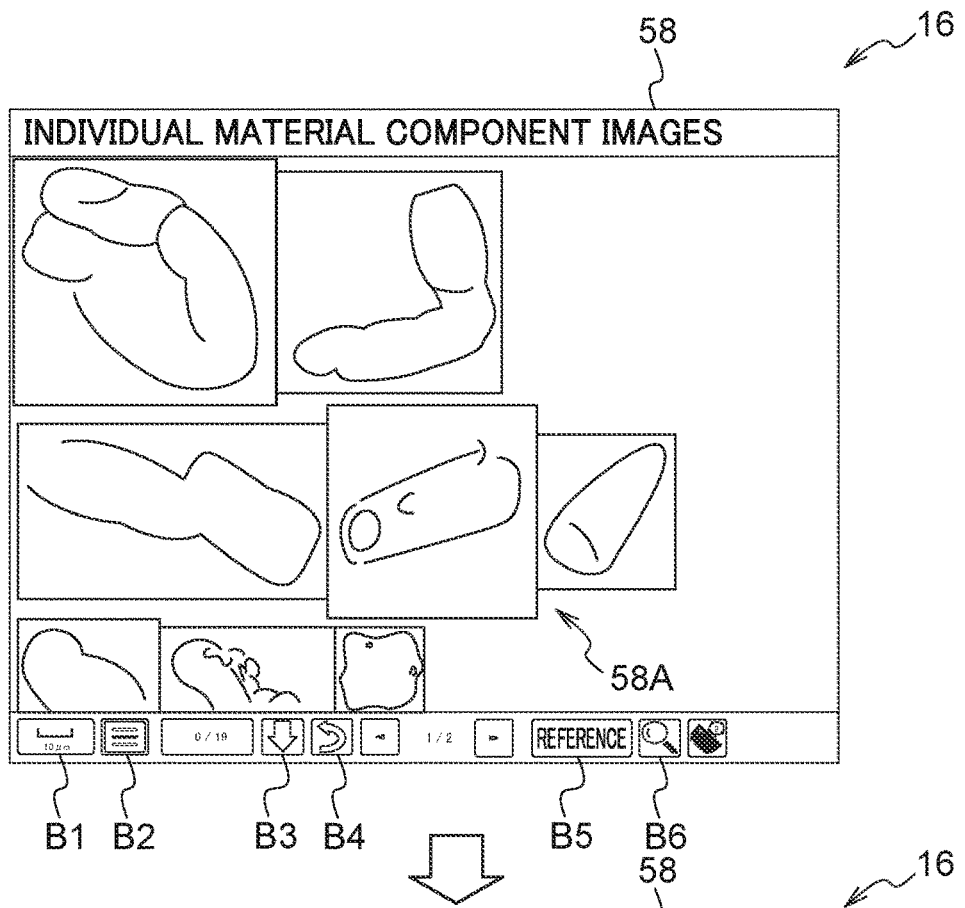
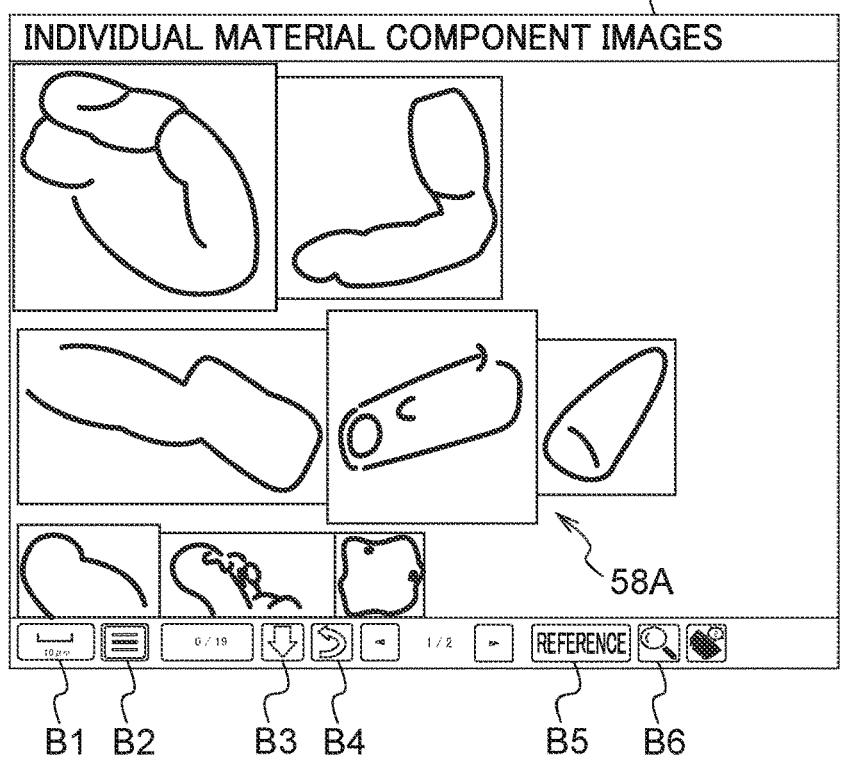

INFORMATION PROCESSING DEVICE, MEASUREMENT SYSTEM, AND NON-TRANSITORY STORAGE MEDIUM

CROSS-REFERENCE TO RELATED APPLICATION

This application is based on and claims priority under 35 USC 119 from Japanese Patent Application No. 2018-216665 filed on Nov. 19, 2018, the disclosure of which is incorporated by reference herein.

BACKGROUND

Technical Field

The present disclosure relates to an information processing device, a measurement system, and a non-transitory storage medium.

Related Art

For example, Japanese Patent Application Publication (JP-B) No. H06-43948 discloses a method for analyzing particles in a particle-containing fluid specimen. This method includes a step of making a liquid specimen flow through a flow cell, and distributing the particles across an enlarged region such that the particles essentially do not overlap each other, and a step of forming plural still optical images of the fluid specimen over this area such that each optical image represents a different part of the region. This method further includes a step of converting the respective still optical images into electronic images including particle images, a step of extracting the particle images and synthesizing an electronic image, and a step of displaying the particle images in an ordered array by classes of visually discernible characteristics.

According to the technology disclosed in JP-B No. H06-43948, the particle images are displayed by size, and a user is able to delete particle images that do not belong in a given class. However, the deleted particle images are not categorized into a different class. There is thus a desire to improve the precision of categorization.

In image capture using a flow method, images of a specimen flowing through a flow cell are captured, images of material components are extracted from the captured images, and the material components are categorized by type for examination. When this is performed, automatically categorized material component images are checked by a user such as a medical practitioner, and are sometimes manually re-categorized. However, even when such images are manually re-categorized, there is no appropriate display for such re-categorization processing, with the result that incorrect user operation can sometimes lead to incorrect re-categorization.

SUMMARY

In consideration of the above circumstances, the present disclosure provides an information processing device, a measurement system, and a non-transitory storage medium capable of suppressing incorrect categorization when re-categorizing material component images obtained by image capture using a flow method and categorized into predetermined categories.

An information processing device according to a first aspect of the present disclosure includes a categorizing section configured to extract a material component image identified as a material component, from plural images obtained by imaging a sample fluid containing plural types of material component and flowing through a flow cell, and to categorize the extracted material component image, which serves as a detected component by predetermined category, and a control section configured to control to re-categorize a material component image, serving as the detected component already categorized by the categorizing section, into a different category, such that, in a case in which selection of a movement destination category is received in a state in which a first image list of material component images included in a category of the detected component is being displayed by a display section, in a subsequent state in which the first image list and a second image list of material component images included in the movement destination category are being displayed at the same time by the display section, a material component image selected from the first image list is moved to the second image list.

An information processing device according to a second aspect of the present disclosure is the first aspect, wherein the control section is further configured to control to emphasize display of the material component image that has been moved from the first image list to the second image list.

An information processing device according to a third aspect of the present disclosure is the second aspect, wherein the control to emphasize display is control to display the material component image at a top position of the second image list.

An information processing device according to a fourth aspect of the present disclosure is the first aspect, wherein each of the categories is designated as at least one of a main category item or a sub-category item that is a subdivision of the main category item, and the control section is further configured to control to display the material component image in an image list of material component images included in the main category item in a case in which the main category item has been selected when selecting the movement destination category, and to display the material component image in an image list of material component images included in the sub-category item in a case in which the sub-category item has been selected when selecting the movement destination category.

An information processing device according to a fifth aspect of the present disclosure is the fourth aspect, wherein the sub-category item is selectable after the main category item has been selected.

An information processing device according to a sixth aspect of the present disclosure is the first aspect, wherein the control section is further configured to control to switch display of each of the material component images in the first image list between plural of the material component images having different focal positions to each other in a depth direction of the flow cell.

An information processing device according to a seventh aspect of the present disclosure is the first aspect, wherein the control section is further configured to control to color code items when displaying the items corresponding to the respective categories.

An information processing device according to an eighth aspect of the present disclosure is the first aspect, wherein the categorizing section is further configured to compute a degree of matching for a categorization result of the material component image, and perform control to display material component images in the first image list arranged according to the degree of matching in either a best-match sequence or a worst-match sequence.

An information processing device according to a ninth aspect of the present disclosure is the first aspect, wherein the control section is further configured to control to display an overview of measurement results for each of the categories, and to apply a mark indicating check completion to a category among the categories displayed in the overview for which the first image list has been displayed and checking of material component images performed.

An information processing device according to a tenth aspect of the present disclosure is the first aspect, wherein the control section is further configured to control to set an enlargement ratio of the material component images when being displayed in the first image list.

An information processing device according to an eleventh aspect of the present disclosure is the first aspect, wherein the control section is configured to control to set at least one of a brightness or a contrast ratio of the material component images when being displayed in the first image list.

An information processing device according to a twelfth aspect of the present disclosure is the first aspect, further includes a storage section configured to store the material component image categorized by the categorizing section and a reference image for the material component image, wherein the control section is further configured to control to add a material component image, serving as the detected component categorized by the categorizing section, as the reference image for the same category as the category of the detected component, such that, in a case in which an instruction to display the reference image has been received in a state in which a material component image list of material component images included in the category of the detected component is being displayed by the display section, in a subsequent state in which the material component image list and a reference image list of the reference images are being displayed at the same time on the display section, a material component image selected from the material component image list is copied into the reference image list.

An information processing device according to a thirteenth aspect of the present disclosure includes a categorizing section configured to extract a material component image identified as a material component from plural images obtained by imaging a sample fluid containing plural types of material component and flowing through a flow cell, to categorize the extracted material component image, serving as a detected component, by predetermined category, a storage section configured to store the material component image categorized by the categorizing section and a reference image for the material component image, and a control section configured to control to add a material component image, serving as the detected component categorized by the categorizing section, as the reference image for the same category as the category of the detected component, such that, in a case in which an instruction to display the reference image has been received in a state in which a material component image list of material component images included in a category of the detected component is being displayed by a display section, in a subsequent state in which the material component image list and a reference image list of the reference images are being displayed at the same time by the display section, a material component image selected from the material component image list is copied into the reference image list.

An information processing device according to a fourteenth aspect of the present disclosure is the thirteenth aspect, wherein the control section is further configured to as to perform control to emphasize display of the material component image copied from the material component image list into the reference image list.

An information processing device according to a fifteenth aspect of the present disclosure is the fourteenth aspect, wherein the control to emphasize display is control to display the material component image at a top position of the reference image list.

An information processing device according to a sixteenth aspect of the present disclosure is the thirteenth aspect, wherein each of the categories is designated as at least one of a main category item or a sub-category item that is a subdivision of the main category item, and the control section is further configured to control to display the material component image in an image list of material component images included in the main category item in a case in which the main category item has selected when selecting the detected component category, and to display the material component image in an image list of material component images included in the sub-category item in a case in which the sub-category item has been selected when selecting the detected component category.

An information processing device according to a seventeenth aspect of the present disclosure is the thirteenth aspect, wherein the control section is further configured to control to switch display of each of the material component images in the material component image list between plural of the material component images having different focal positions to each other in a depth direction of the flow cell.

An information processing device according to an eighteenth aspect of the present disclosure is the thirteenth aspect, wherein the control section is further configured to control to color code items when displaying the items corresponding to the respective categories.

An information processing device according to a nineteenth aspect of the present disclosure is the thirteenth aspect, wherein the categorizing section is further configured to compute a degree of matching for a categorization result of the material component image, and the control section is further configured to control to display material component images in the material component image list arranged according to the degree of matching in either a best-match sequence or a worst-match sequence.

An information processing device according to a twentieth aspect of the present disclosure is the thirteenth aspect, wherein the control section is further configured to control to set an enlargement ratio of the material component images when being displayed in the material component image list.

An information processing device according to a twenty-first aspect of the present disclosure is the thirteenth aspect, wherein the control section is further configured to control to set at least one of a brightness or a contrast ratio of the material component images when being displayed in the material component image list.

A measurement system according to a twenty-second aspect of the present disclosure includes a flow cell configured to allow a sheath fluid and a sample fluid containing plural types of material components to flow through, an imaging section configured to image the sample fluid flowing through the flow cell, and the information processing device of the first aspect configured to control on plural images obtained by imaging with the imaging section.

A non-transitory storage medium according to a twenty-third aspect of the present disclosure stores a program for causing a computer to execute processing. The processing includes extracting a material component image identified as a material component from plural images obtained by imaging a sample fluid containing plural types of material components and flowing through a flow cell, and categorizing the extracted material component image, which serves as a detected component, by predetermined category, and performing control to re-categorize an already categorized material component image, serving as the detected component, into a different category, such that, in a case in which selection of a movement destination category is received in a state in which a first image list of material component images included in a category of the detected component is being displayed by a display section, in a subsequent state in which the first image list and a second image list of material component images included in the movement destination category are being displayed at the same time by the display section, a material component image selected from the first image list is moved to the second image list.

As described above, incorrect categorization when re-categorizing material component images obtained by image capture using a flow method and categorized into predetermined categories may be suppressed.

BRIEF DESCRIPTION OF THE DRAWINGS

Exemplary embodiments of the present invention will be described in detail based on the following figures, wherein:

FIG. 6 is a face-on view illustrating an example of a measurement result screen according to the first exemplary embodiment;

FIG. 10 is a face-on view illustrating an example of a re-categorization task screen according to the first exemplary embodiment before and after image quality adjustment;

DETAILED DESCRIPTION

Detailed explanation follows regarding examples of exemplary embodiments of the present disclosure, with reference to the drawings.

First Exemplary Embodiment

Figure 1:
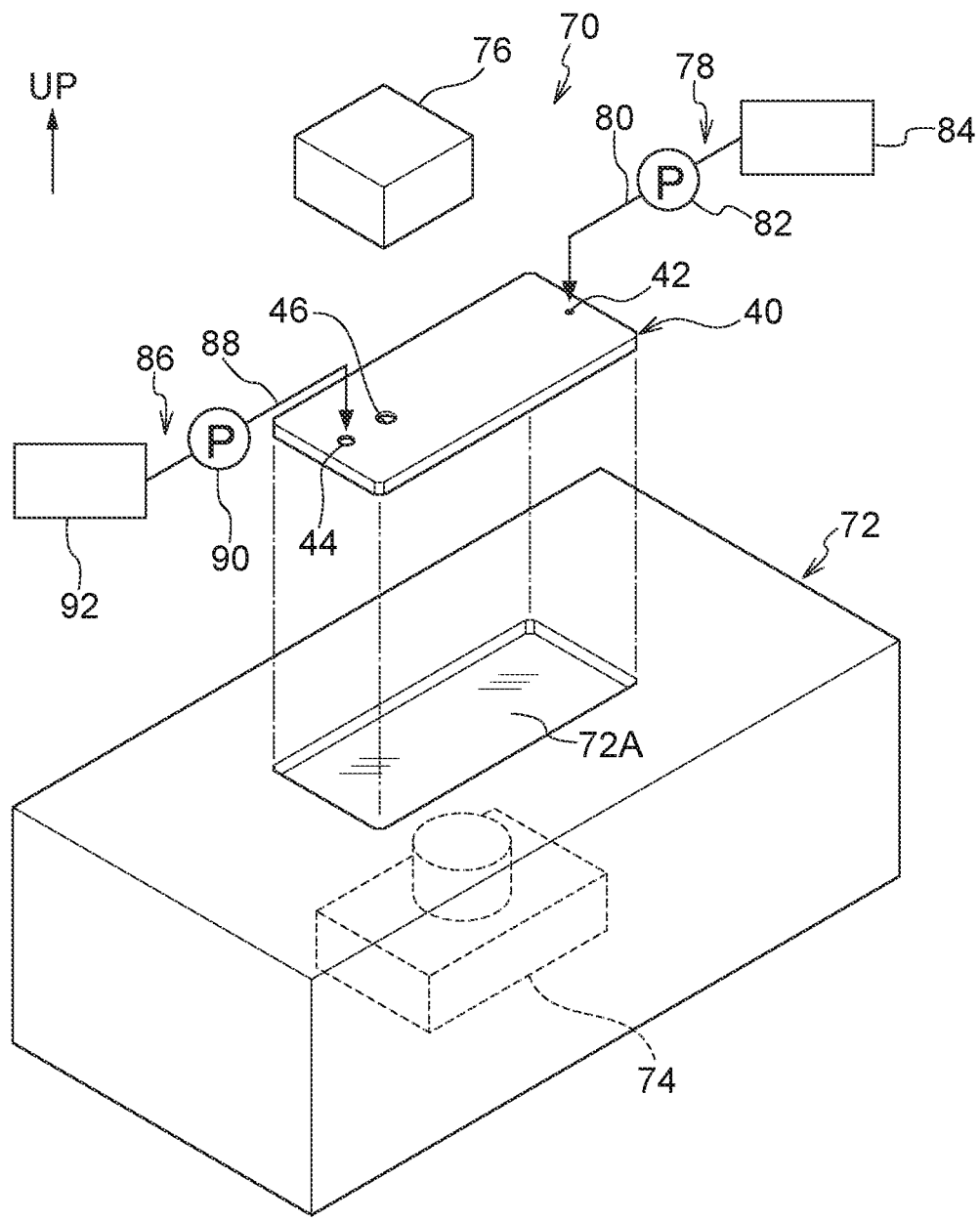
FIG. 1 is a perspective view illustrating part of a configuration of a measurement system according to a first exemplary embodiment.

FIG. 1 is a perspective view illustrating part of a configuration of a measurement system 70 according to a first exemplary embodiment.

As illustrated in FIG. 1, the measurement system 70 according to the present exemplary embodiment includes a flow cell 40, casing 72, a camera 74, and a light source 76. Note that the arrow UP in FIG. 1 indicates upward in a vertical direction of the measurement system 70.

The flow cell 40 according to the present exemplary embodiment is, for example, applicable to urinary material component examinations (urinary sediment examinations) in which a urine sample serving as an example of a sample fluid is introduced together with a sheath fluid in order to capture images of material components in the urine sample using the camera 74 and to perform various analyses based on the shapes etc. of the material components in the captured image. The camera 74 is an example of an imaging section. Plural types of material components are contained in the urine sample. Examples of types of material components include red blood cells, white blood cells, epithelial cells, casts, bacteria, and the like. Note that although in the present exemplary embodiment a case is described in which a urine sample serving as an example of a sample fluid is used to perform a urinary material component examination, blood, cells, bodily fluids, or the like may also be employed for material component examination.

The measurement system 70 includes the casing 72 to place the flow cell 40 in. A recess 72A for inserting the flow cell 40 into is formed in the casing 72. A position of the casing 72 that includes where the recess 72A is provided is formed by a transparent member (for example glass). The camera 74 is provided inside the casing 72 at a position facing toward the flow cell 40. The light source 76 is provided at the upper side of the casing 72, at a position facing toward the camera 74 across the flow cell 40. The camera 74 is disposed at a position that enables the sample fluid flowing through the flow cell 40 to be imaged.

The measurement system 70 includes a first supply device 78 to supply the sample fluid into a sample intake port 42 of a sample flow path (not illustrated in the drawings) in the flow cell 40. The first supply device 78 includes a supply tube 80 having one end connected to the sample intake port 42, a pump 82 provided partway along the supply tube 80, and a sample storage section 84 for storing the sample fluid in that is connected to the other end of the supply tube 80.

The measurement system 70 includes a second supply device 86 to supply the sheath fluid into a sheath intake port 44 of a sheath flow path (not illustrated in the drawings) in the flow cell 40. The second supply device 86 includes a supply tube 88 having one end connected to the sheath intake port 44, a pump 90 provided partway along the supply tube 88, and a tank 92 for storing the sheath fluid in that is connected to the other end of the supply tube 88.

A discharge port 46 is also provided to the flow cell 40 between the sample intake port 42 and the sheath intake port 44. One end of a discharge tube (not illustrated in the drawings) is connected to the discharge port 46, and the other end of the discharge tube is connected to a waste tank (not illustrated in the drawings). The flow cell 40 includes a merging section (not illustrated in the drawings) to merge the sample introduced through the sample intake port 42 with the sheath fluid introduced through the sheath intake port 44, and the merged fluid flows through a flow path. A tapered section is formed in the flow path where the height of the flow path gradually decreases. The sample therefore does not disperse in the sheath fluid even after the sample has merged with the sheath fluid, and instead the flow is localized to a flattened shape. The material components in the localized sample fluid are imaged by the camera 74.

Figure 2:
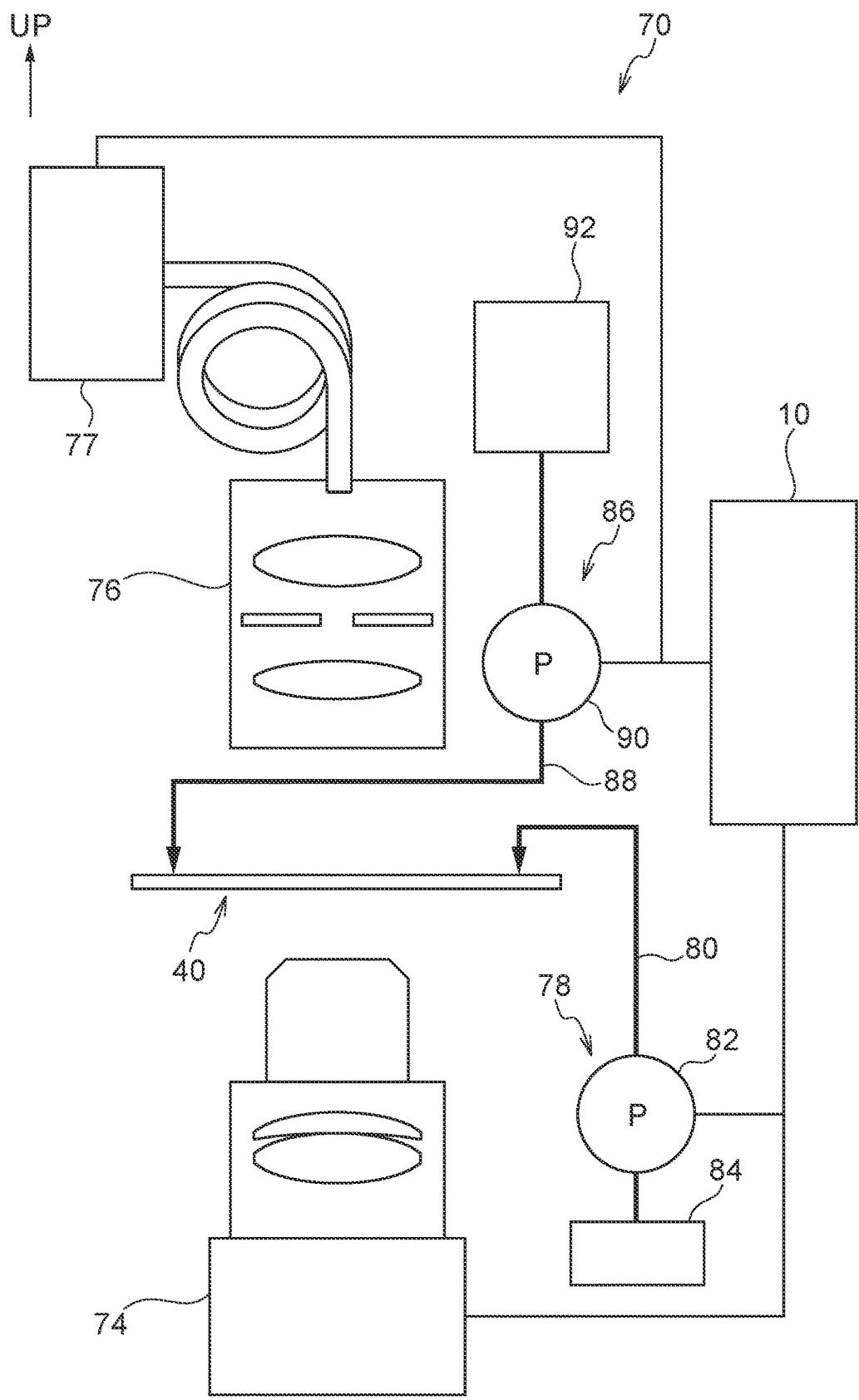
FIG. 2 is a schematic view illustrating an example of a configuration of a measurement system according to the first exemplary embodiment.

FIG. 2 is a schematic diagram illustrating an example of a configuration of the measurement system 70 according to the first exemplary embodiment.

As illustrated in FIG. 2, the measurement system 70 according to the present exemplary embodiment includes an information processing device 10. Note that the arrow UP in FIG. 2 indicates upward in the vertical direction of the measurement system 70, similarly to in FIG. 1.

The information processing device 10 includes the functionality of a control device to control the respective operations of the camera 74, a light source actuation section 77 electrically connected to the light source 76, the pump 82, and the pump 90. The information processing device 10 applies a pulse signal to the light source actuation section 77 so as to cause the light source 76 to emit light at a predetermined interval. The information processing device 10 drives the pump 82 to control the flow rate of the sample fluid, and drives the pump 90 to control the flow rate of the sheath fluid. Although not illustrated in the drawings, plural of the cameras 74 and optical systems to guide light to the respective cameras 74 may be provided. Each optical system is adjusted such that the respective cameras 74 focus on different positions (in the height direction) within the flow cell 40. In other words, the plural cameras 74 are at the same position as each other in a horizontal plane, and capture plural images at the same time while focusing on different positions on the optical axis. These simultaneously captured images are associated with each other and stored in a storage section 14. The height direction here is a direction perpendicular to the flow direction of the sample fluid, and corresponds to the vertical direction in FIG. 2. The respective focal points are at different distances from a wall face of the flow cell 40 on a side near the cameras 74.

Figure 3:
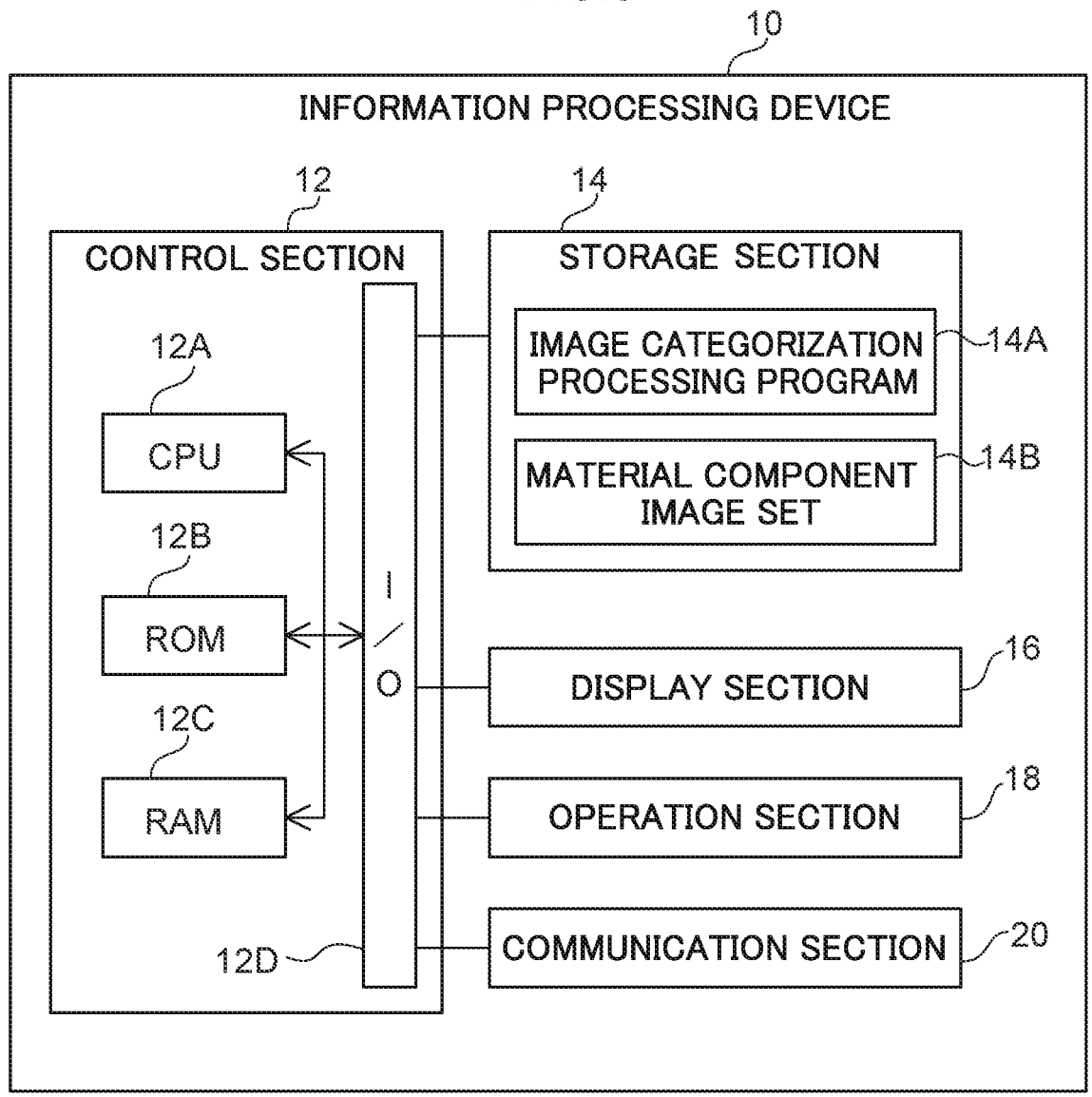
FIG. 3 is a block diagram illustrating an example of an electrical configuration of an information processing device according to the first exemplary embodiment.

FIG. 3 is a block diagram illustrating an example of an electrical configuration of the information processing device 10 according to the first exemplary embodiment.

As illustrated in FIG. 3, the information processing device 10 according to the present exemplary embodiment includes a control section 12, the storage section 14, a display section 16, an operation section 18, and a communication section 20.

For example, a generic computer such as a personal computer (PC) is employed as the information processing device 10 according to the present exemplary embodiment. Note that a portable computer such as a smartphone, tablet, or the like may also be employed as the information processing device 10. The information processing device 10 may also be split between plural units. For example, the information processing device 10 may be configured so as to include a unit for controlling a measurement system composed of the camera 74, the light source 76, the pump 82, the pump 90 etc., and to include a unit to perform processing and analysis on images captured by the camera 74. The information processing device 10 may be an external device connected to the measurement system 70.

The control section 12 includes a central processing unit (CPU) 12A, read only memory (ROM) 12B, random access memory (RAM) 12C, and an input/output interface (I/O) 12D. These sections are connected together through a bus.

Each of the functional sections including the storage section 14, the display section 16, the operation section 18, and the communication section 20 are connected to the I/O 12D. These functional sections are capable of communicating with the CPU 12A through the I/O 12D.

The control section 12 may be configured as a sub-control section to control the operation of parts of the information processing device 10, or may be configured as part of a main control section to control overall operation of the information processing device 10. For example, large scale integrated (LSI) circuits or integrated circuit (IC) chip sets are employed for some or all of the respective blocks of the control section 12. A separate circuit may be employed for each block, or circuits integrating together some or all of the blocks may be employed. The respective blocks may be provided so as to be integrated together, or some of the blocks may be provided separately. Alternatively, parts of the respective blocks may be provided separately. Integration of the control section 12 is not limited to integration employing LSIs, and dedicated circuits or generic processors may also be employed therefor.

Examples of the storage section 14 include a hard disk drive (HDD), a solid state drive (SSD), a flash memory, or the like. An image categorization processing program 14A to perform image categorization processing according to the present exemplary embodiment is stored in the storage section 14. Note that the image categorization processing program 14A may alternatively be stored in the ROM 12B. The storage section 14 is also stored with a material component image set 14B for use in the image categorization processing. Note that the storage section 14 may have external memory attached that is expanded later.

The image categorization processing program 14A may, for example, be pre-installed in the information processing device 10. The image categorization processing program 14A may be stored on a non-volatile storage medium, or may be implemented by being distributed via a network and installed or uploaded to the information processing device 10 as appropriate. Note that examples of non-volatile storage media include compact disc read only memory (CD-ROM), a magneto-optical disc, an HDD, digital versatile disc read only memory (DVD-ROM), flash memory, a memory card, and so on.

For example, a liquid crystal display (LCD) or an organic electro luminescence (EL) display may be employed as the display section 16. The display section 16 may include an integral touch panel. A device for operation input, such a keyboard or a mouse may be provided to the operation section 18. The display section 16 and the operation section 18 receive various instructions from a user of the information processing device 10. The display section 16 displays various information, such as the result of processing executed in response to an instruction received from the user and notifications relating to processing.

The communication section 20 is connected to a network such as the internet, a local area network (LAN), or a wide area network (WAN), and is capable of communicating over the network with external devices such as an image forming device or another PC.

Figure 4:
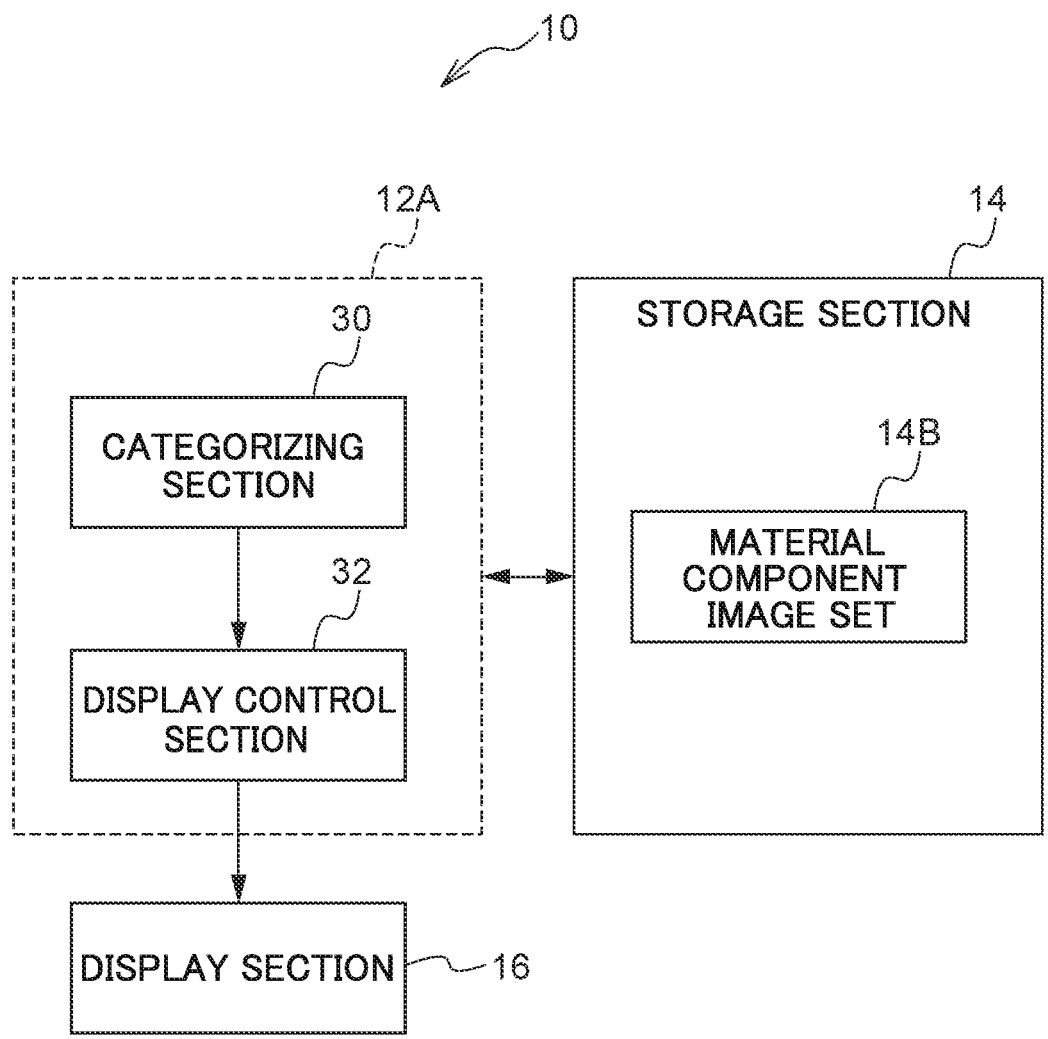
FIG. 4 is a block diagram illustrating an example of a functional configuration of an information processing device according to the first exemplary embodiment.

The CPU 12A of the information processing device 10 according to the present exemplary embodiment functions as the respective sections illustrated in FIG. 4 by writing the image categorization processing program 14A stored in the storage section 14 into the RAM 12C and executing the image categorization processing program 14A.

FIG. 4 is a block diagram illustrating an example of a functional configuration of the information processing device 10 according to the first exemplary embodiment.

As illustrated in FIG. 4, the CPU 12A of the information processing device 10 according to the present exemplary embodiment functions as a categorizing section 30 and a display control section 32. Note that the display control section 32 is an example of a control section.

The categorizing section 30 according to the present exemplary embodiment takes plural images (for example 300 or 1000 images) obtained by the camera 74 imaging the sample fluid flowing through the flow cell 40, and from the plural images, extracts material component images of the plural types of material component contained in a sample fluid. The categorizing section 30 then categorizes the extracted material component images into predetermined categories (for example by the type, size, or shape of the material components, or by the presence or absence of a nucleus therein). The material component images categorized into the predetermined categories by the categorizing section 30 are stored in the storage section 14 as a material component image set 14B for each sample. Note that various known methods may be employed as the method for identifying material components in the images, such as a method employing machine learning or a method employing pattern matching. The material component image set 14B is also referred to as the material component images 14B when referring to individual material component images within the material component image set 14B.

Figure 8:
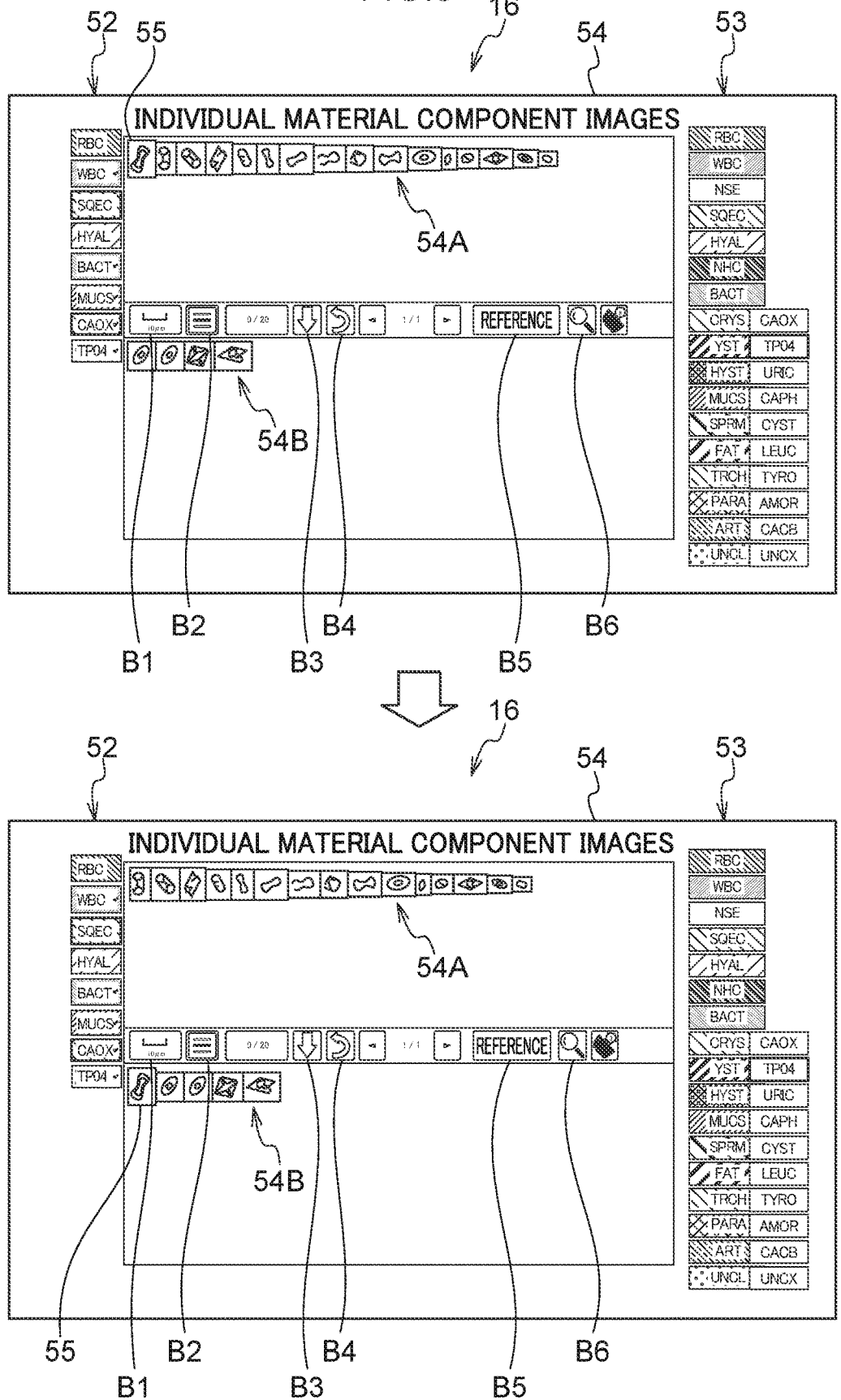
FIG. 8 is a face-on view illustrating examples of a re-categorization task screen according to the first exemplary embodiment.

The display control section 32 according to the present exemplary embodiment performs control to display material component images serving as detected components categorized by the categorizing section 30 as individual material component images on the display section 16. An operator such as a medical practitioner is able to manually change categories when visually checking the individual material component images. Accordingly, when an operator re-categorizes a material component image, as illustrated in FIG. 8, described later, for example, the display control section 32 performs control to display a first image list of material component images included under a first type of detected component, and a movement destination list (second image list) of material component images included under a second type, on a single screen. A material component image moved to the second image list is re-categorized to the category corresponding to the second type, and saved as such. Note that the detected components are any material components extracted as material component images from the images captured by the camera 74.

In the present exemplary embodiment, the first type and the second type configure different categories to each other, and category changing is performed for the material component images. When this is performed, the display control section 32 receives a selection of movement destination category in a state in which the first image list categorized as the first type is displayed, and then performs control to move a material component image selected from the first image list to the second image list in a state in which the first image list and the movement destination second image list categorized as the second type are displayed at the same time as each other. Namely, when this is performed, the material component image selected from the first image list is deleted from the first image list and displayed in the second image list. Note that a specific example of such screens will be described later.

Figure 5:
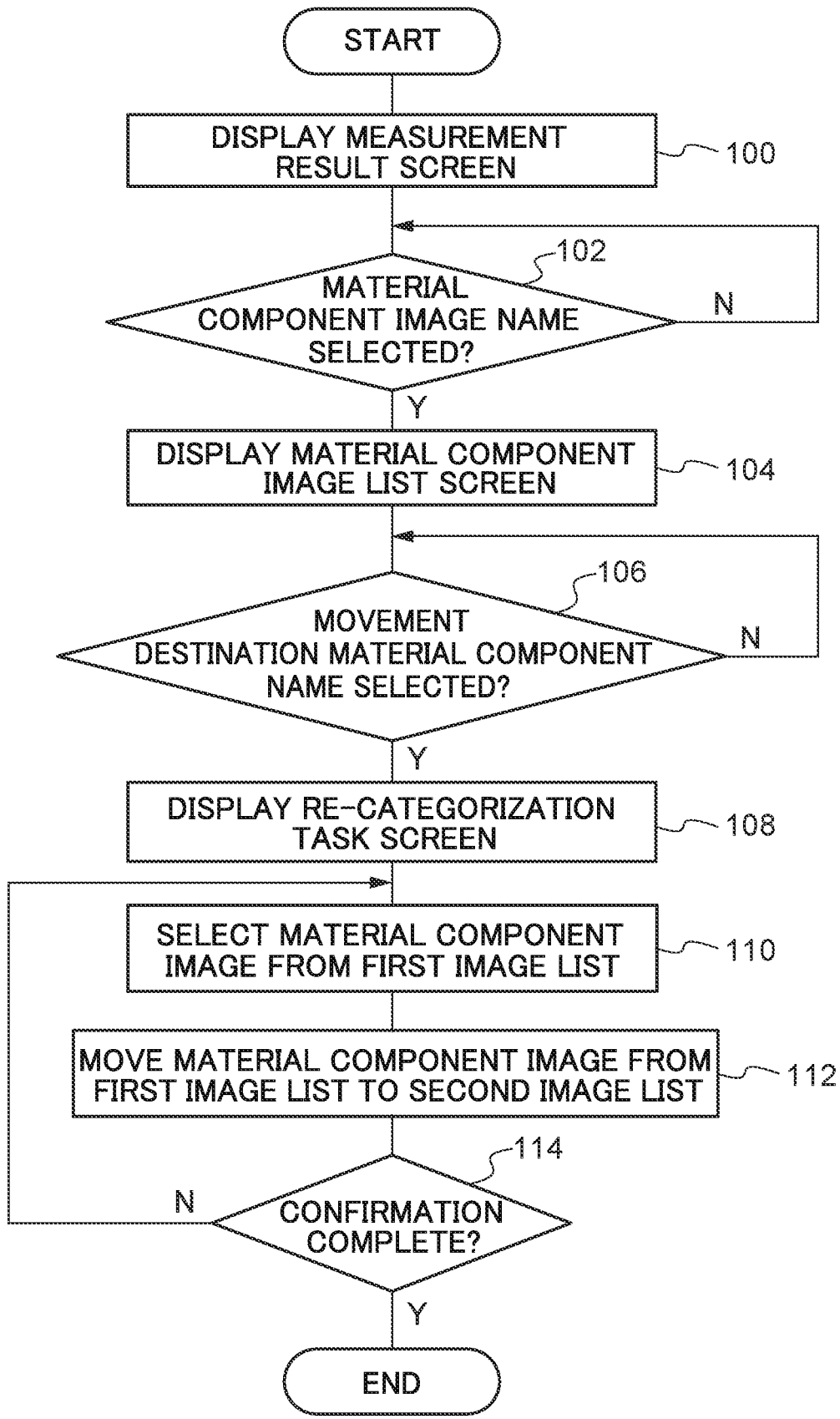
FIG. 5 is a flowchart illustrating an example of a flow of processing by an image categorization processing program according to the first exemplary embodiment.

Explanation follows regarding operation of the information processing device 10 according to the first exemplary embodiment, with reference to FIG. 5.

FIG. 5 is a flowchart illustrating an example of a flow of processing by the image categorization processing program 14A according to the first exemplary embodiment.

First, when the information processing device 10 receives an instruction to display a measurement result screen, the following steps are executed. Note that in the present exemplary embodiment, the material component image set 14B is stored in the storage section 14 as an automatic categorization result of the categorizing section 30. The measurement result screen is a screen displayed following automatic categorization by the categorizing section 30.

At step 100 in FIG. 5, as an example the display control section 32 performs control to display a measurement result screen 50 as illustrated in FIG. 6, described later.

At step 102, the display control section 32 determines whether or not selection of a category item representing the name of a material component corresponding to a detected component has been received through operator instruction via the measurement result screen 50 illustrated in FIG. 6, described later, displayed at step 100. When determined that selection of a category item has been received (when determination is affirmative), processing transitions to step 104, and when determined that selection of a category item has not been received (when determination is negative), standby is performed at step 102.

Figure 7:
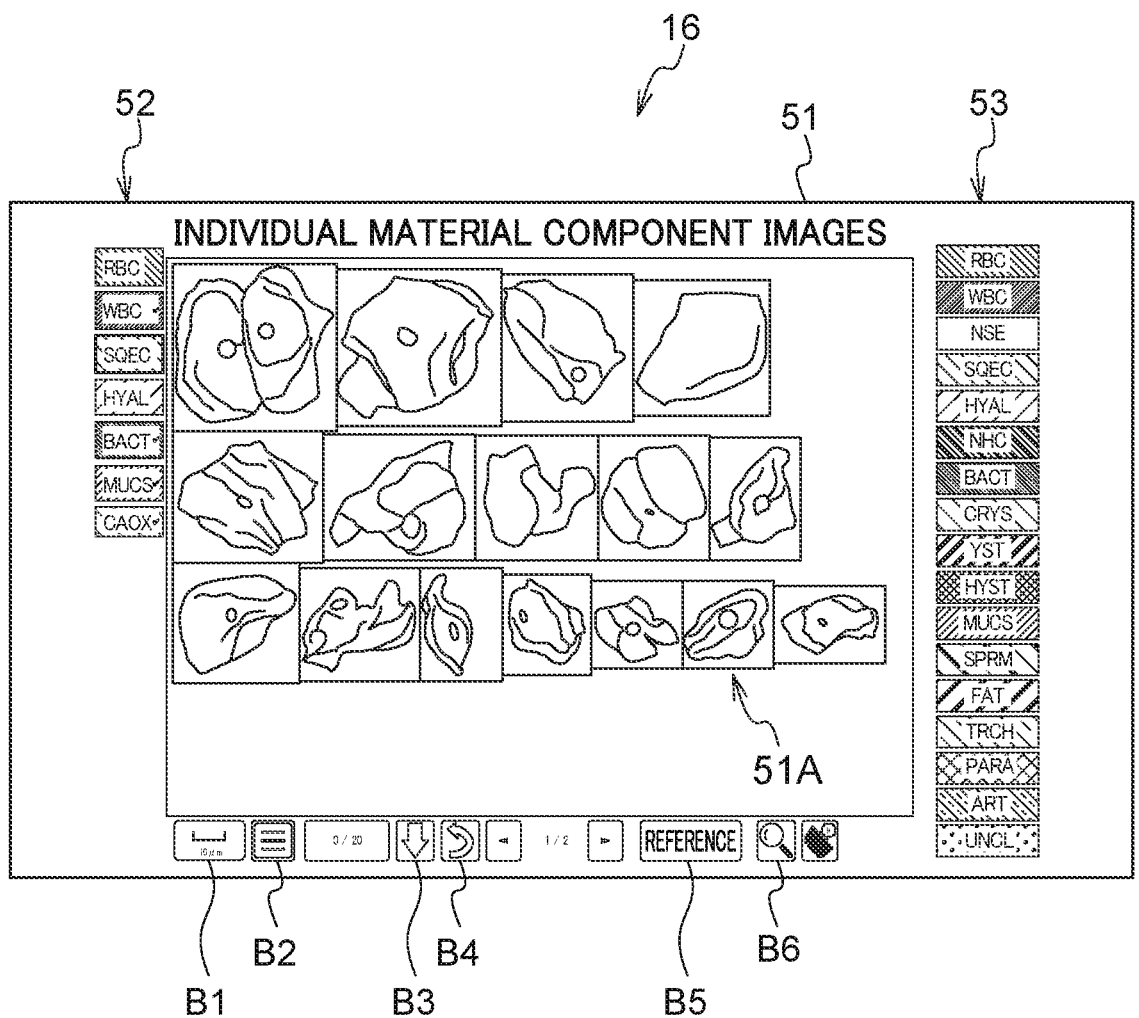
FIG. 7 is a face-on view illustrating an example of a material component image list screen according to the first exemplary embodiment.

At step 104, as an example the display control section 32 performs control to display a material component image list screen 51 as illustrated in FIG. 7, described later, in response to the received category item selected at step 102.

At step 106, the display control section 32 determines whether or not selection of a category item indicating a movement destination material component name has been received through operator instruction via the material component image list screen 51 illustrated in FIG. 7, described later, displayed at step 104. When determined that selection of a movement destination material component name has been received (when determination is affirmative), processing transitions to step 108, and when determined that selection of a movement destination material component name has not been received (when determination is negative), standby is performed at step 106.

At step 108, as an example the display control section 32 performs control to display a re-categorization task screen 54, illustrated in FIG. 8, described later. On the re-categorization task screen 54, a first image list of material component images included under a first type of detected component, and a movement destination list (second image list) of material component images included under a second type of detected component are displayed on a single screen. In the present exemplary embodiment, the first image list and the second image list are configured by material component images obtained and extracted from measurement of a single sample, and the first type and the second type are material components belonging to different categories.

At step 110, the display control section 32 receives selection of one material component image, configuring a category change target, from the first image list displayed at step 108, through operator instruction.

At step 112, the display control section 32 performs control to delete the material component image selected at step 110 from the first image list, and to display this material component image in the second image list displayed at step 108. Namely, the display control section 32 performs control to move the material component image selected from the first image list to the second image list.

At step 114, the display control section 32 determines whether or not category change checking for the first image list displayed at step 108 has been completed. When determined that category change checking has not been completed (when determination is negative), processing returns to step 110 and is repeated. When determined that category change checking has been completed (when determination is affirmative), the current processing sequence by the image categorization processing program 14A is ended.

Next, explanation follows regarding specific examples of screens during image re-categorization processing according to the present exemplary embodiment, with reference to FIG. 6 to FIG. 11.

FIG. 6 is a face-on view illustrating an example of the measurement result screen 50 according to the first exemplary embodiment.

As illustrated in FIG. 6, the measurement result screen 50 according to the present exemplary embodiment displays an overview of measurement results by item. The measurement results are displayed as the material component name, the content or content count of this component, qualitative indices for content, or the like. Material component names 50A and material component buttons 50B are also provided on the measurement result screen 50.

Main items among the items illustrated in FIG. 6 include, for example, RBC (red blood cells), WBC (white blood cells), NSE (non-squamous epithelial cells), SQEC (squamous epithelial cells), NHC (non-hyaline casts), and BACT (bacteria). Moreover, CRYS (crystals), YST (yeast), HYST (hyaline casts), MUCS (mucus), SPRM (spermatozoa), and WBCC (white blood cell clumps) are also illustrated.

The display control section 32 performs control to apply a mark on the measurement result screen 50 indicating check completion to each category for which the first image list corresponding to a category selected from the category items has been displayed and the material component images have been checked. In the measurement result screen 50 illustrated in FIG. 6, a mark 50C indicating check completion is applied to each item out of the category items for which the first image list has been checked. Note that when re-categorization (category change) has been performed, measurement results reflecting the outcome of the change are displayed.

Applying the marks to items once the material component images have been checked in this manner enables overlooked checking to be suppressed.

When one of the material component names 50A or the material component buttons 50B on the measurement result screen 50 illustrated in FIG. 6 is selected by a click operation or the like, individual material component images corresponding to the selected category item are displayed as in the material component image list screen 51 illustrated in FIG. 7 as an example.

FIG. 7 is a face-on view illustrating an example of a material component image list screen 51 according to the first exemplary embodiment.

As illustrated in FIG. 7, a material component image list 51A in which the images selected as material components require checking is displayed on the material component image list screen 51 according to the present exemplary embodiment. The material component image list screen 51 is displayed on the display section 16.

The material component image list screen 51 illustrated in FIG. 7 includes a first item button array 52 corresponding to the detected components, and a second item button array 53 corresponding to movement destinations. The first item button array 52 corresponding to the detected components is provided corresponding to each type of detected component. Similarly, the second item button array 53 corresponding to movement destinations is provided corresponding to each category item that is a movement destination. As an example, as described above RBC (red blood cells), WBC (white blood cells), and SQEC (squamous epithelial cells) are displayed. FIG. 7 illustrates an example in which SQEC has been selected from the first item button array 52 corresponding to the detected components, and so the material component image list screen 51 displays a list of images of squamous epithelial cells.

In the material component image list screen 51 illustrated in FIG. 7, plural operable operation buttons B1 to B6 are also displayed. The operation button B1 is a button to enlarge display of the material component images and also display the scale (length) together with the image enlargement. In the example illustrated in FIG. 7, the scale displayed is 10 μm/pixel. The operation button B2 is a button to switch display to a different focal position of the material component images. In the example illustrated in FIG. 7, it is possible to switch the focal position between three layers, namely an upper layer, a middle layer, and a lower layer, in the height direction of the flow cell 40. The operation button B3 is a button to move a material component image of a detected component to a movement destination. The operation button B4 is a button to return to the preceding image category editing operation. The operation button B5 is a button to display "reference" material component images, described later. The operation button B6 is a button to display a window used to set an enlargement ratio of the material component images and to set the brightness, contrast ratio, or the like of the material component images.

Material component image display modes can be changed by operation of the plural operation buttons B1 to B6 illustrated in FIG. 7, thereby making the material components easier to distinguish. Note that each of the operation buttons may be displayed on the display section 16, configured by a touch panel, or may be provided as the operation section 18.

When any item button from the second item button array 53 corresponding to movement destinations has been selected by a click operation or the like on the material component image list screen 51 illustrated in FIG. 7, as an example, the re-categorization task screen 54 illustrated at the upper of FIG. 8 is displayed. On the re-categorization task screen 54, a first image list corresponding to detected components and a second image list corresponding to the movement destination are displayed on a single screen.

FIG. 8 is a face-on view illustrating examples of the re-categorization task screen 54 according to the first exemplary embodiment.

As illustrated in FIG. 8, the re-categorization task screen 54 according to the present exemplary embodiment displays the first item button array 52 corresponding to the detected components, a first image list 54A, the second item button array 53 corresponding to movement destinations, and a second image list 54B. The re-categorization task screen 54 is displayed on the display section 16.

As illustrated at the upper of FIG. 8, on the re-categorization task screen 54 according to the present exemplary embodiment, since a "CAOX" item button in the first item button array 52 has been selected, the first image list 54A corresponding to material component images included under CAOX is displayed in an upper tier. Moreover, since a "TP04" item button in the second item button array 53 has been selected, the second image list 54B corresponding to material component images included under TP04 is displayed in a lower tier.

When an operator selects a material component image 55 included in the first image list 54A at the upper of FIG. 8 and operates the operation button B3 in order to change the category of the material component image 55, the screen transitions to the re-categorization task screen 54 illustrated at the lower of FIG. 8. Note that the selected material component image 55 may also be dragged and dropped into the second image list 54B.

In the re-categorization task screen 54 illustrated at the lower of FIG. 8, the selected material component image 55 has been deleted from the first image list 54A and displayed in the second image list 54B.

Note that the display control section 32 preferably emphasizes display of the material component image 55 selected from the first image list 54A in the second image list 54B. As an example, as illustrated at the lower of FIG. 8, the material component image 55 is displayed at a top position of the second image list 54B. Alternatively, a predetermined mark (for example a star or circle) may be applied to the material component image 55. Alternatively, a frame around the material component image 55 may be made bold, changed to a predetermined color (for example red or blue), or may be displayed at a larger size than the other images. This enables the image to be identified easily after being moved to the movement destination.

Distinct design colors for the respective items are applied to each item button of the first item button array 52 corresponding to the detected components and each item button of the second item button array 53 corresponding to the movement destinations. In the example illustrated in FIG. 8, the different design colors are represented by different hatching. Specifically, as an example, the RBC item button is red, the WBC item button is blue, and the SQEC item button is green.

Applying distinct design colors to each of the items in this manner enables an easily understood visual display for each item. This enables items to be suppressed from being mistaken for one another. Mistakes and incorrect operation can also be effectively suppressed from the perspective that relationships between the detected components and the movement destinations can be made more obvious, groupings such as larger categories and smaller categories can be made more obvious, and priority can be given to display of items that are important from an examination perspective.

At least some of the items of the second item button array 53 corresponding to the movement destinations are designated as at least one out of a main category item or a sub-category item that is a subdivision of a main category item. Here, in cases in which a main category item has been selected, the display control section 32 displays material component images 55 in an image list of the material component images included under the main category item, and in cases in which a sub-category item has been selected, the display control section 32 displays material component images 55 in an image list of the material component images included under the sub-category item. In this manner, the sub-category items are provided as sub-categories of the main category items, enabling the ease of operation to be improved by making the movement destinations visually clearer. Note that material component images of sub-category items included under a main category item may be displayed at the same time as the material component images corresponding to the main category item.

In the examples illustrated at the upper and lower of FIG. 8, in the part of the second item button array 53 where two buttons are displayed in each row, the ten item buttons from "CRYS" to "UNCL" displayed on the left side are main category items, and the ten item buttons from "CAOX" to "UNCX" disposed next to and on the right side of the main category items are sub-category items. As an example, even in cases in which plural sub-category items are included under a single main category item, only one sub-category item is displayed in order to take up less display space. It is desirable to select the sub-category item after selecting the main category item. In the examples illustrated at the upper and lower of FIG. 8, as an example the sub-category item, "CAOX" is selectably displayed after the main category item "CRYS" has been selected. This enables a more compact display while preventing selection errors. Note that in cases in which plural sub-category items are included under a main category item, after the main category item has been selected, a pop-up display of the plural sub-category items included under the main category item may be selectably displayed. Moreover, buttons corresponding to the main category items and the sub-category items may also be displayed in the first item button array 52 for processing similar to that described above.

When categorizing material component images, the categorizing section 30 computes a degree of matching based on an image identification method (for example a pattern matching method) that is currently in use. The display control section 32 displays the material component images in the first image list 54A in order according to the degree of matching, in sequence from the best-match or from the worst-match. The degree of matching referred to here refers to a category certainty level for an identification result image, with a higher value being applied the higher the degree of conformity with an image that is known to be correct or with predetermined characteristic points for images of each category item. In cases in which there is complete conformity with the image known to be correct or the characteristic points, the degree of matching is 100%. When displaying in best-match sequence, the material component images are displayed in sequence from highest degree of matching, and when displaying in worst-match sequence, the material component images are displayed in sequence starting with the lowest degree of matching. Namely, material component images having a comparatively low degree of matching correspond to images that require re-categorization. By arranging the material component images in worst-match sequence, images with a higher probability of being re-categorized are displayed first, such that the attention of the operator is drawn more easily to these images.

By grouping together and prioritizing display of material component images requiring re-categorization in this manner, the ease of operation when re-categorizing is improved, enabling the burden of checking to be alleviated. Configuration may be made to display numerical values for the degree of matching, apply marks to indicate a high degree of matching (for example of 80% or higher) and a lower degree of matching (for example of 50% or lower), or color-coded display or the like may be performed.

Figure 9A:
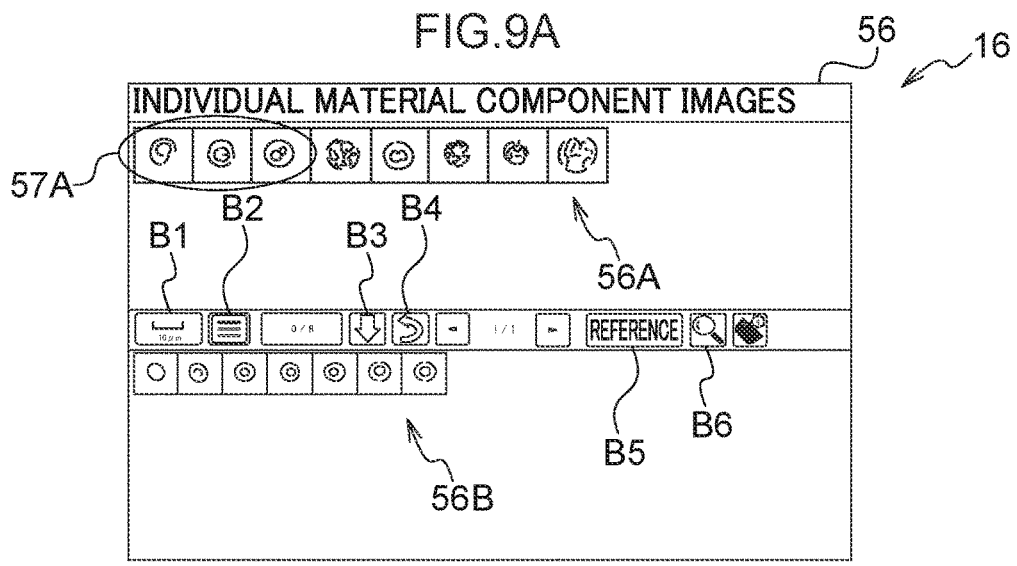
FIG. 9A is a face-on view illustrating an example of a re-categorization task screen according to the first exemplary embodiment, in a case in which a focal position is at an upper layer.
Figure 9B:
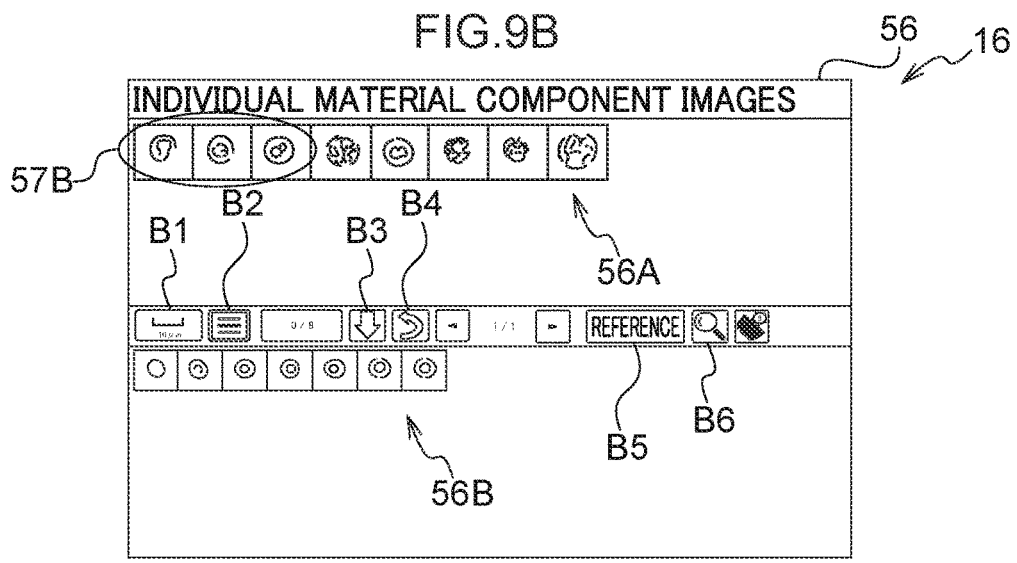
FIG. 9B is a face-on view illustrating an example of a re-categorization task screen according to the first exemplary embodiment, in a case in which a focal position is at a middle layer.
Figure 9C:
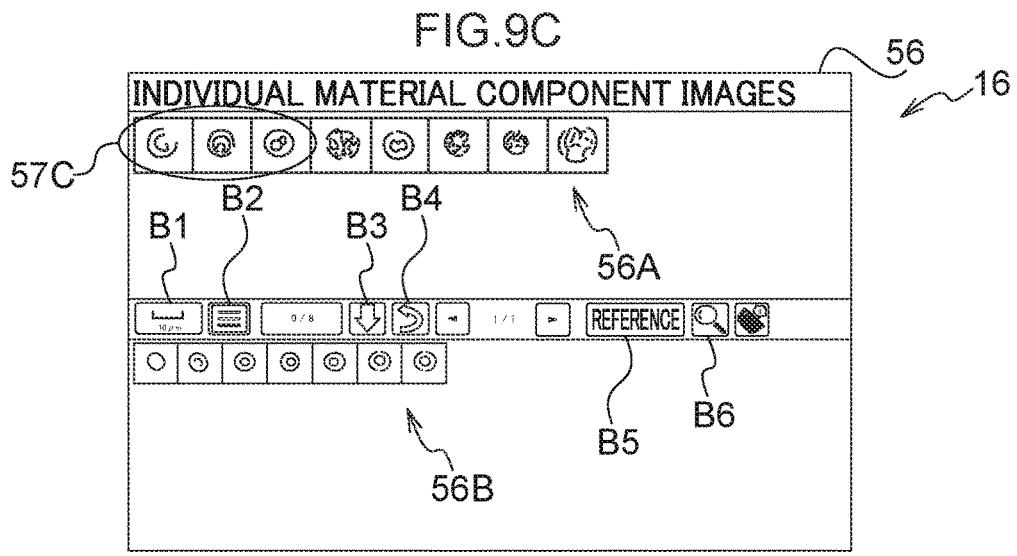
FIG. 9C is a face-on view illustrating an example of a re-categorization task screen according to the first exemplary embodiment, in a case in which a focal position is at a lower layer.

As an example, as illustrated in FIG. 9A to FIG. 9C, the display control section 32 may display so as to switch between plural obtained images in cases in which images have been captured simultaneously at plural different focal positions for each of the material component images in the first image list.

FIG. 9A is a face-on view illustrating an example of a re-categorization task screen 56 according to the first exemplary embodiment in a case in which the focal position is at the upper layer. FIG. 9B is a face-on view illustrating an example of a re-categorization task screen 56 according to the first exemplary embodiment in a case in which the focal position is at the middle layer. FIG. 9C is a face-on view illustrating an example of a re-categorization task screen 56 according to the first exemplary embodiment in a case in which the focal position is at the lower layer.

As illustrated in FIG. 9A to FIG. 9C, the re-categorization task screen 56 according to the present exemplary embodiment displays a first image list 56A and a second image list 56B. The re-categorization task screen 56 is displayed on the display section 16.

In FIG. 9A, three material component images 57A included in the first image list 56A are images captured at the focal position at the upper layer. In FIG. 9B, three material component images 57B included in the first image list 56A are images captured at the focal position at the middle layer. In FIG. 9C, three material component images 57C included in the first image list 56A are images captured at the focal position at the lower layer. Note that the upper layer represents the shortest distance between the focal point and the wall face of the flow cell 40 on the side nearest the camera 74. The lower layer represents the longest distance between the focal point and the wall face of the flow cell 40 on the side nearest the camera 74. The middle layer represents a distance between the focal point and the wall face of the flow cell 40 on the side nearest the camera 74 that is between those in the cases of the upper layer and the lower layer. Switching between images captured at different focal positions is performed by operating the operation button B2. Note that images captured at the focal position at the middle layer are displayed by default. The focal position for display may be switched for all of the material component images included in the first image list 56A, or for selected material component images only.

Switching the focal position of the material component images included in the first image list 56A to display material component images from different focal positions in this manner enables the operator to perform checking by visual comparison with the material component images included in the second image list 56B. This improves the ability to see material components with an internal structure, such as a nucleus, thus improving categorization precision.

Moreover, as an example, as illustrated in FIG. 10, the display control section 32 performs control to set at least one out of the brightness or contrast ratio for the material component images of each type of detected component.

FIG. 10 is a face-on view illustrating an example of a re-categorization task screen 58 according to the first exemplary embodiment before and after image quality adjustment. As an example, FIG. 10 illustrates a first image list corresponding to hyaline casts (HYAL).

In the re-categorization task screen 58 illustrated at the upper of FIG. 10, a first image list 58A prior to image quality adjustment is displayed. In the re-categorization task screen 58 illustrated at the lower of FIG. 10, the first image list 58A after image quality adjustment is displayed. The re-categorization task screen 58 is displayed on the display section 16.

When the operation button B6 illustrated in FIG. 10 is operated, a window (not illustrated in the drawings) for setting various parameters relating to image quality of the material component images and for setting an enlargement ratio for the material component images is opened. As an example, the various parameters relating to image quality include at least one out of brightness or contrast ratio. The various parameters relating to image quality set using the window displayed in response to operation of the operation button B6 are applied to all of the material component images included under the corresponding item.

As an example, as illustrated at the upper of FIG. 10, depending on the item, sometimes images might be difficult to see due to the structure of the material components. By adjusting the image quality of the material component images by item, the ability to see the material component images can be improved, enabling more efficient re-categorization. For example, for items in which there is little texture and the contrast ratio is low, such as with hyaline casts, viscous fluid threads, and some red blood cells, the ability to see can be improved by increasing the contrast ratio compared to that for other items.

Figure 11:
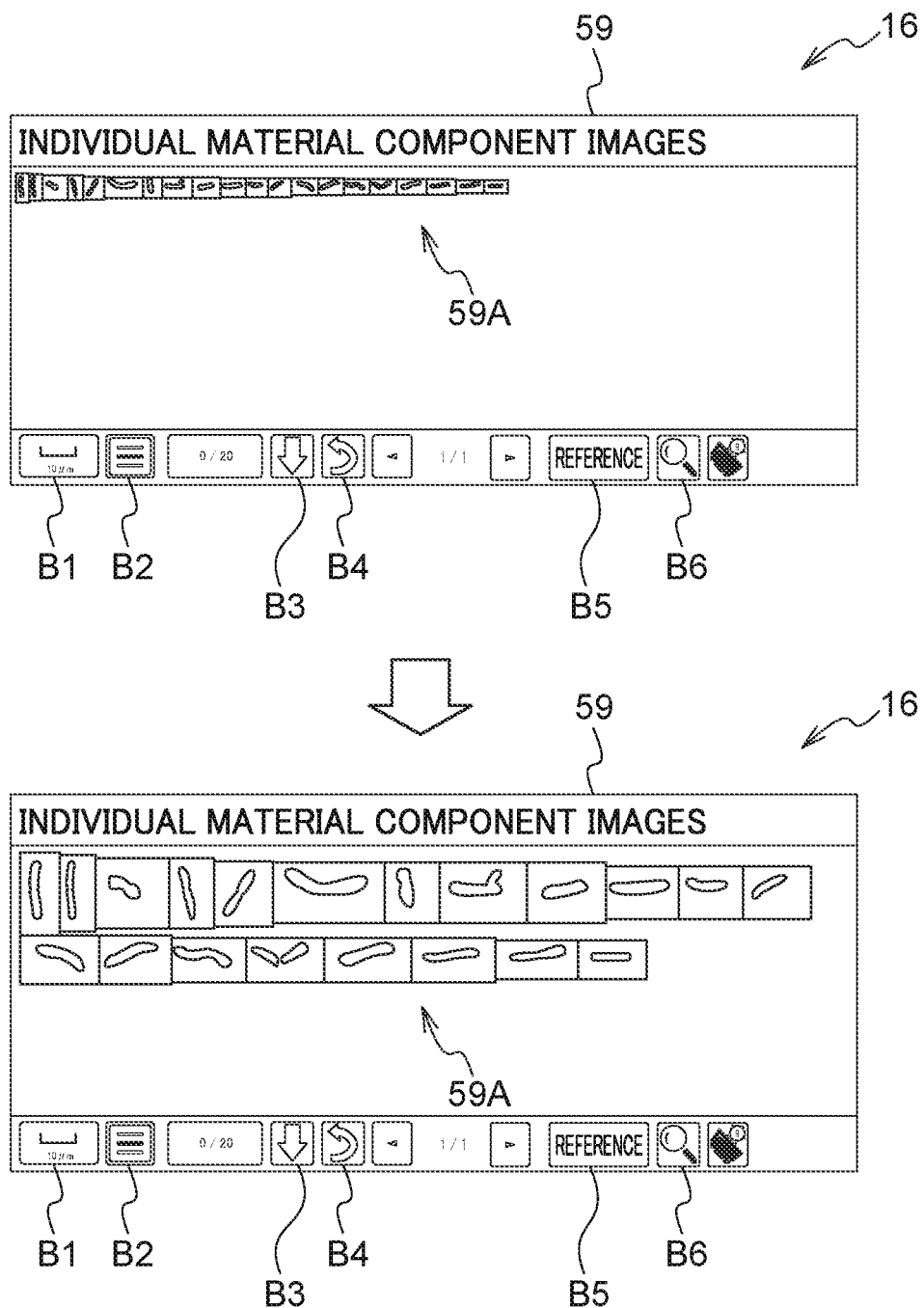
FIG. 11 is a face-on view illustrating an example of a re-categorization task screen according to the first exemplary embodiment before and after image enlargement.

As illustrated in FIG. 11 as an example, the display control section 32 also performs control to set the enlargement ratio of the material component images for each type of detected component.

FIG. 11 is a face-on view illustrating an example of a re-categorization task screen 59 according to the first exemplary embodiment before and after enlarging images. As an example, FIG. 11 illustrates a first image list for bacteria (BACT).

The re-categorization task screen 59 at the upper of FIG. 11 displays a first image list 59A prior to image enlargement. The re-categorization task screen 59 illustrated at the lower of FIG. 11 displays the first image list 59A after image enlargement. The re-categorization task screen 59 is displayed on the display section 16.

When the operation button B6 illustrated in FIG. 11 is operated, a window for setting the enlargement ratio of the material component images is opened, as described above. The enlargement ratio set using the window displayed in response to operation of the operation button B6 is applied to all of the material component images included under the corresponding item.

As illustrated at the upper of FIG. 11 as an example, depending on the item, sometimes material component images are too small to see clearly, such that the ease of operation is poor. Setting the enlargement ratio of the material component images by item enables the ability to see the material component images and ease of operation to be improved, thereby enabling incorrect operation to be reduced, and enabling more efficient re-categorization. Note that although examples have been illustrated in which the operation buttons B1 to B6 are provided below the first image list in the upper tier, there is no limitation to this position. For example, operation buttons may be provided below the second image list as desired in order to adjust the image quality of the material component images included in the second image list.

In the present exemplary embodiment as described above, operation can be received while material component images corresponding to the detected components and material component images corresponding to movement destinations are displayed at the same time as each other when changing the category of material component images captured using a flow method and categorized into predetermined categories. This enables incorrect operation to be suppressed.

Second Exemplary Embodiment

In the first exemplary embodiment described above, explanation has been given regarding a mode in which categories of material component images are changed as an example of re-categorization. As another example of re-categorization, in the present exemplary embodiment explanation is given regarding a mode in which material component images are added as a reference. Here, "reference" refers to an image catalog (referred to hereafter as a "reference image list") in which material component images are collected by type for guidance when an operator such as a medical practitioner changes the material component image categories. Images that might provide guidance are selected as the reference images from out of material component images acquired from measurements of numerous samples. An operator has been able to re-categorize material component images while looking at the reference image list as needed. Moreover, if a suitable image that would make a good reference is present among the material component images, an operator has been able to add this image to the reference image list. However, the material component images saved for each sample and the reference image list have been managed separately, such that observation of the material component images and addition of images to the reference image list have been performed separately. In the present exemplary embodiment, observation of the material component images and re-categorization are integrated such that a material component image currently being observed can be added to the reference image list as a reference.

Figure 13:
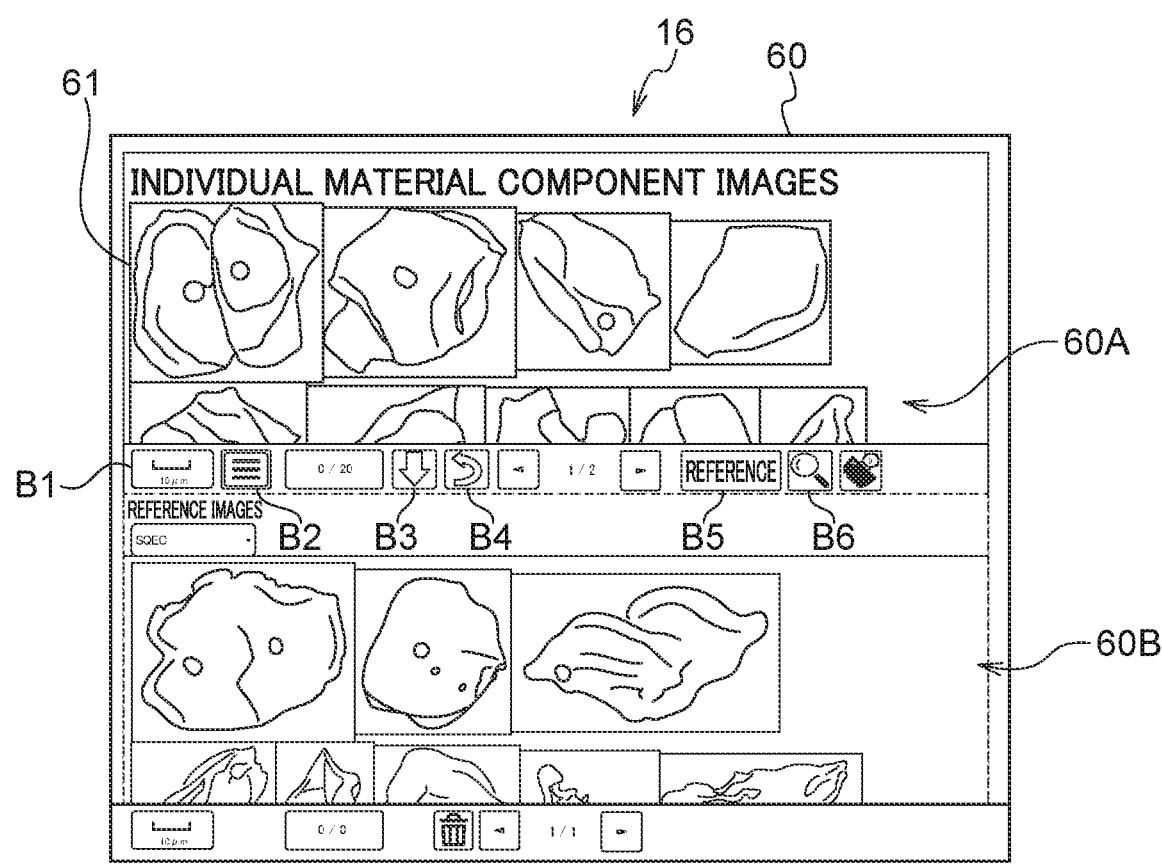
FIG. 13 is a face-on view illustrating an example of a reference task screen according to the second exemplary embodiment.

The storage section 14 is stored with the material component images and reference images for material component images. In cases in which a categorized material component image serving as a detected component is added as a reference image for the same category, as an example the display control section 32 performs control to display a material component image list of the detected components and a reference image list on a single screen, as illustrated in FIG. 13, described later. Note that in order to avoid confusion between the reference image list and an image list for a movement destination such as that described in the first exemplary embodiment, for example, either image list may be displayed with a watermark in the background, or with the background color changed.

In the present exemplary embodiment, a reference is added to the reference image list of material component images. When this is performed, the display control section 32 receives a reference image display instruction in a state in which the material component image list is being displayed. Then, in a state in which the material component image list and the reference image list are being displayed at the same time, the display control section 32 performs control to copy a material component image selected from the material component image list into the reference image list. Namely, when this is performed, the material component image selected from the material component image list remains in the material component image list, but is also displayed in the reference image list. When adding a reference, the copy source category (first type) and the copy destination category (second type) are the same as each other. A specific example of the screen is described later.

Figure 12:
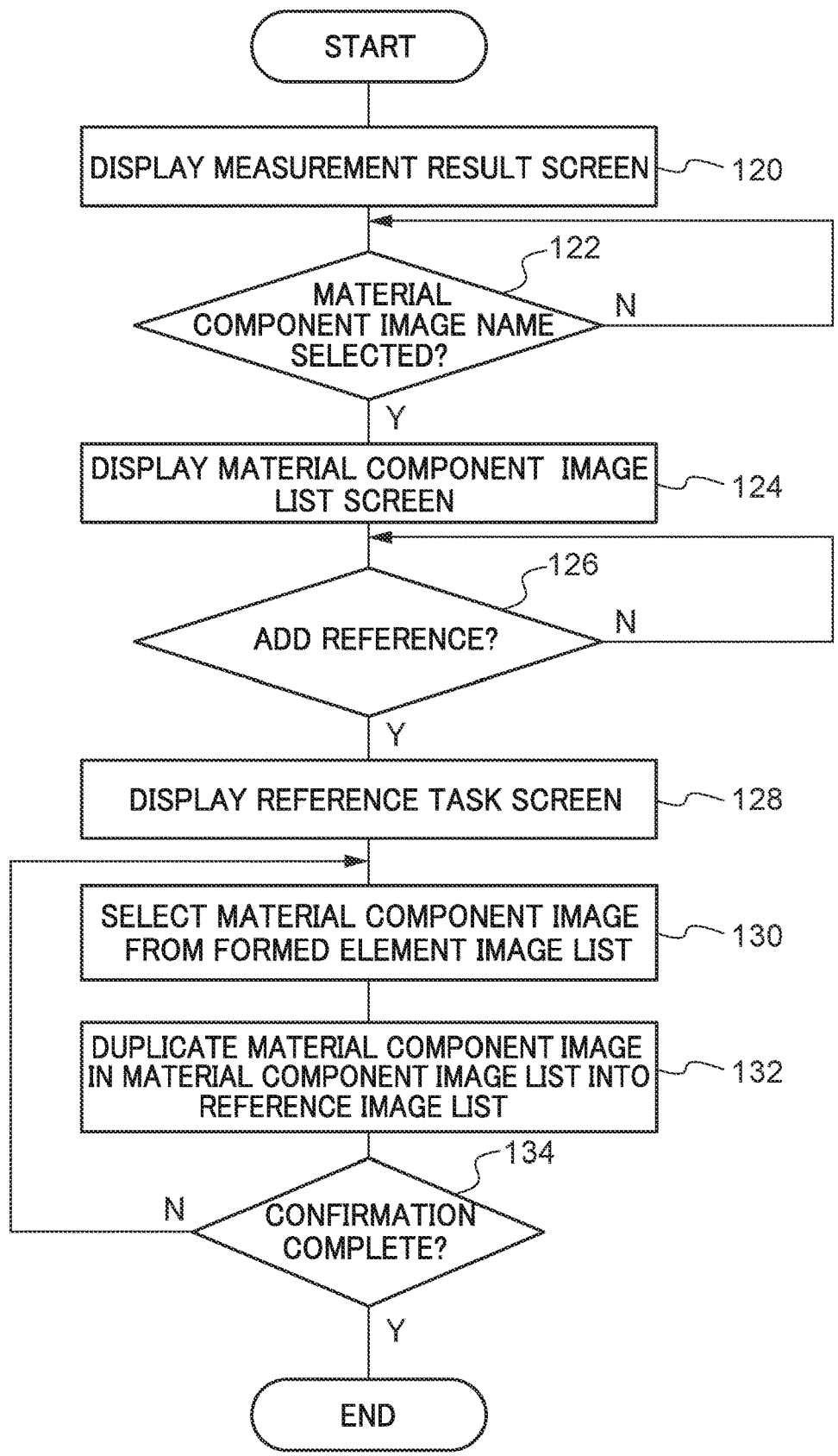
FIG. 12 is a flowchart illustrating an example of a flow of processing by an image categorization processing program according to a second exemplary embodiment.

Explanation follows regarding operation of the information processing device 10 according to the second exemplary embodiment, with reference to FIG. 12.

FIG. 12 is a flowchart illustrating an example of a flow of processing by the image categorization processing program 14A according to the second exemplary embodiment.

First, similarly to in the first exemplary embodiment described above, when the information processing device 10 receives an instruction to display the measurement result screen, the following steps are executed.

At step 120 in FIG. 12, as an example the display control section 32 performs control to display the measurement result screen 50 illustrated in FIG. 6, described previously.

At step 122, the display control section 32 determines whether or not operator instruction has been received to select a category item indicating a material component name corresponding to a detected component from the measurement result screen 50 illustrated in FIG. 6, described previously, displayed at step 120. When determined that selection of a category item has been received (when determination is affirmative), processing transitions to step 124, and when determined that selection of a category item has not been received (when determination is negative), standby is performed at step 122.

At step 124, as an example the display control section 32 performs control to display the material component image list screen 51 illustrated in FIG. 7, described previously, according to the category item selection received at step 122.

At step 126, the display control section 32 determines whether or not operator instruction to display reference images has been received via the material component image list screen 51 displayed at step 124 and illustrated in FIG. 7 described previously. When determined that a reference image display instruction has been received (when determination is affirmative), processing transitions to step 128, and when determined that a reference image display instruction has not been received (when determination is negative), standby is performed at step 126.

At step 128, as an example the display control section 32 performs control to display a reference task screen 60 illustrated in FIG. 13, described later. On the reference task screen 60, a material component image list of detected components and a copy destination reference image list are displayed on a single screen. In the present exemplary embodiment, the first type and the second type correspond to the same category as each other, such that reference images of the same type as the material components being displayed in the upper tier in FIG. 13 are automatically displayed in the lower tier in FIG. 13 according to an operation instruction to add a reference.

At step 130, the display control section 32 receives operator instruction to select one material component image as a reference addition target from the material component image list displayed at step 128.

At step 132, the display control section 32 performs control to display the material component image selected at step 130 in the reference image list displayed at step 128 while the material component image also remains in the material component image list. Namely, as an example, as illustrated in FIG. 14, described later, the selected material component image element is copied into the reference image list.

At step 134, the display control section 32 determines whether or not reference addition checking has been completed for the material component image list displayed at step 128. When determined that reference addition checking has not been completed (when determination is negative), processing returns to step 130 and is repeated. When determined that reference addition checking has been completed (when determination is affirmative), the current processing sequence by the image categorization processing program 14A is ended.

Figure 14:
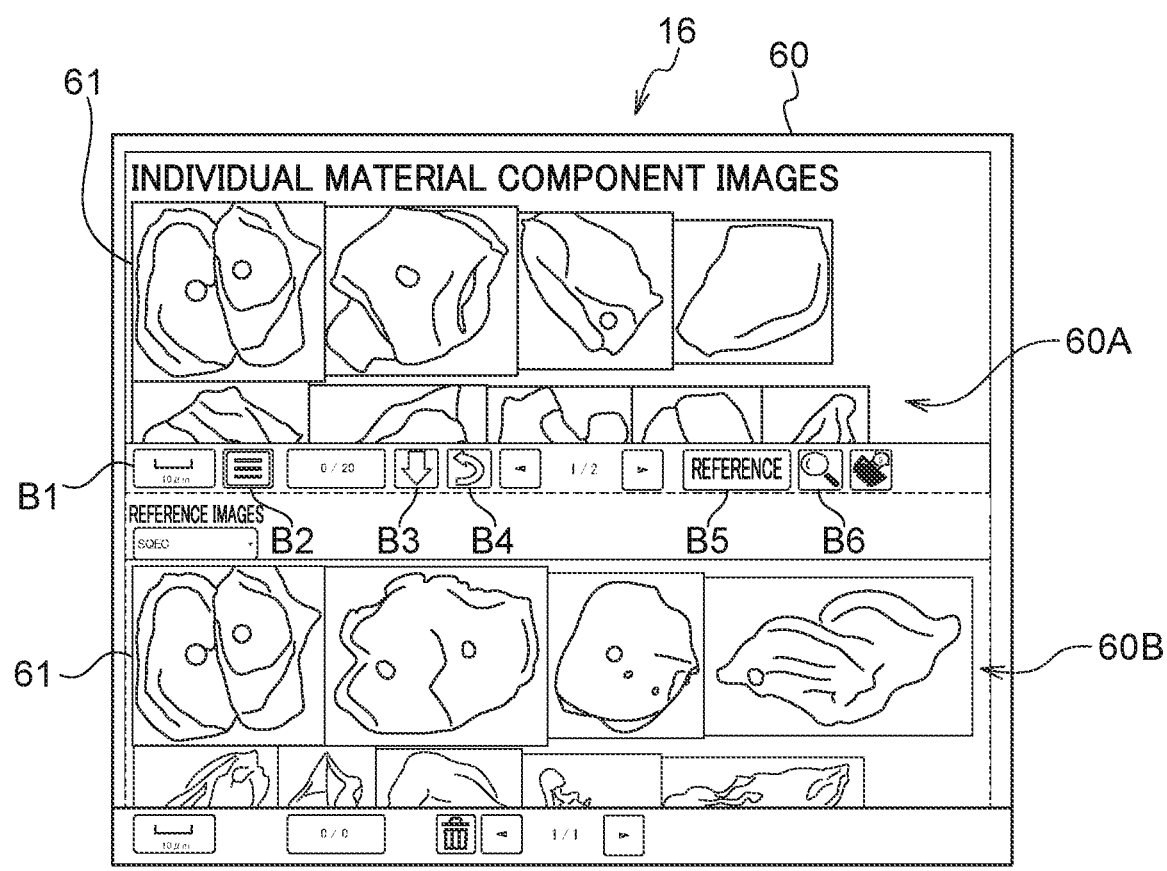
FIG. 14 is a face-on view illustrating another example of a reference task screen according to the second exemplary embodiment.

Next, explanation follows regarding a specific example of screens during reference addition processing according to the present exemplary embodiment, with reference to FIG. 13 and FIG. 14. In reality, operation is performed using the first item button array 52, the second item button array 53, and the operation buttons B1 to B6. However, in the interests of simplicity, the first item button array 52 and the second item button array 53 illustrated in FIG. 7 and FIG. 8 are omitted from illustration in the examples illustrated in FIG. 13 and FIG. 14.

When the operation button B5 (reference addition button) is selected by click operation or the like on the material component image list screen 51 illustrated in FIG. 7 described previously, as an example the reference task screen 60 illustrated in FIG. 13 is displayed. On the reference task screen 60, a material component image list of detected components and a reference image list configuring a copy destination are displayed on a single screen.

FIG. 13 and FIG. 14 are face-on views illustrating an example of the reference task screen 60 according to the second exemplary embodiment.

As illustrated in FIG. 13, the reference task screen 60 according to the present exemplary embodiment displays a material component image list 60A of detected components, and a reference image list 60B configuring a copy destination. The reference task screen 60 is displayed on the display section 16.

As illustrated in FIG. 13, a selection operation is performed for the squamous epithelial cell (SQEC) item button in the first item button array 52 (see FIG. 7), such that the material component image list 60A corresponding to material component images included under SQEC is displayed in the upper tier of the reference task screen 60 according to the present exemplary embodiment. The operation button B5 is then operated such that the reference image list 60B corresponding to the material component images included under SQEC, i.e. the same item, is displayed in the lower tier of the reference task screen 60.

In FIG. 13, when the operator selects a material component image 61 included in the material component image list 60A and performs a click operation on the operation button B3 or the like in order to add the material component image 61 as a reference, the reference task screen 60 transitions to the reference task screen 60 as illustrated in FIG. 14. Note that the selected material component image 61 may be dragged and dropped into the reference image list 60B.

When the previously described operation button B3 is operated, as illustrated in FIG. 14, the material component image 61 selected from the material component image list 60A is displayed in the reference image list 60B, while also remaining in the material component image list 60A.

Note that similarly to in the first exemplary embodiment, it is desirable for the display control section 32 to emphasize display of the material component image 61 selected from the material component image list 60A in the reference image list 60B. As an example, the material component image 61 is displayed at a top position of the reference image list 60B. Alternatively, a predetermined mark (for example a star or circle) may be applied to the material component image 61. Alternatively, a frame around the material component image 61 may be made bold, changed to a predetermined color (for example red or blue), or may be displayed at a larger size than the other images. This enables the image to be identified easily after being copied as a reference.

Note that in the present exemplary embodiment, the category items described above may be designated as at least one out of a main category item or a sub-category item that is a subdivision of the main category item. When a main category item has been selected during selection of a detected component category, the material component images are displayed in an image list for material component images included under the main category, and when a sub-category has been selected, the material component images are displayed in an image list for material component images included under the sub-category.

Moreover, in the present exemplary embodiment, similarly to in the first exemplary embodiment described above, control may be performed to color code display of items corresponding to each category. Alternatively, control may be performed to switch display of each of the material component images in a material component image list between plural images obtained by imaging at plural different focal positions. Alternatively, control may be performed to display each of the material component images in a material component image list in best-match sequence or worst-match sequence according to a degree of matching as described above. Alternatively, control may also be performed to set an enlargement ratio for the material component images by category. Alternatively, control may be performed to set at least one out of the brightness or contrast ratio of the material component images by category.

In the exemplary embodiment described above, a selected image can be added to the reference image list as a reference in a state in which the material component images obtained by image capture using a flow method are observed as categorized into predetermined categories. This enables incorrect operation to be suppressed.

Explanation has been given regarding an example of an information processing device according to exemplary embodiments. The above exemplary embodiments may be provided in the format of a program configured to cause a computer to execute the functions with which the respective sections of the information processing device are equipped. The above exemplary embodiments may be provided in the format of a computer-readable storage medium stored with such a program.

Configurations of the information processing device described in the above exemplary embodiments are moreover merely examples thereof, and may be modified according to circumstances within a range not departing from the spirit thereof. Material component image display is not limited to that in the exemplary embodiments described above, and for example material component images may be displayed in columns on the left and right. The display positions of the respective buttons may also be modified as appropriate.

The processing flow of the program described in the above exemplary embodiments is moreover also merely an example thereof, and steps not required may be omitted, new steps may be added, or the processing sequence may be altered within a range not departing from the spirit thereof.

Although explanation in each of the above exemplary embodiments is regarding a case in which execution of the program results in the processing of the exemplary embodiment being implemented by a software configuration employing a computer, there is no limitation thereto. For example, an exemplary embodiment may be implemented by a hardware configuration, or by a combination of a hardware configuration and a software configuration.

What is claimed is:

1. An information processing device for examining images taken from a biological sample, the image processing device comprising:
a memory; and
a processor coupled to the memory;
the processor being configured to:
receive a plurality of images obtained by imaging a sample fluid using a camera while the sample fluid is flowing through a flow cell, the sample fluid containing a plurality of types of material components;
identify, from the plurality of images, segments of the images as detected material component images;
extract, from the plurality of images, the identified detected material component images;
categorize the extracted material component images by predetermined category, the category being at least one of type, size, shape of material components, or presence of a nucleus;
display the categorized material component images as a single image list of material component images;
receive a first operator instruction to select a movement destination category into which an operator wishes to re-categorize a material component image from within the single image list;
subsequently display a first image list and a second image list at the same time, the first image list comprising the material component images that have not been re-categorized, including the material component image that the operator wishes to re-categorize, the second image list corresponding to the selected movement destination category;
receive a second operator instruction to select the material component image in the first image list that the operator wishes to re-categorize; and
move the selected material component image from the first image list to the second image list, thereby causing the selected material component image to be re-categorized as being in the movement destination category.

2. The information processing device of claim 1, wherein the processor is further configured to control to emphasize display of the re-categorized material component image that has been moved from the first image list to the second image list.

3. The information processing device of claim 2, wherein the control to emphasize display is control to display the re-categorized material component image at a top position of the second image list.

4. The information processing device of claim 1, wherein:
At least one of the categories is designated as at least one of a main category item or a sub-category item that is a subdivision of the main category item; and
the processor is further configured to control to display the material component image in an image list of material component images included in the main category item in a case in which the main category item has been selected when selecting the movement destination category, and to display the material component image in an image list of material component images included in the sub-category item in a case in which the sub-category item has been selected when selecting the movement destination category.

5. The information processing device of claim 4, wherein the sub-category item is selectable after the main category item has been selected.

6. The information processing device of claim 1, wherein the processor is further configured to control to switch display of each of the material component images in the first image list between a plurality of the material component images having different focal positions to each other in a depth direction of the flow cell.

7. The information processing device of claim 1, wherein the processor is further configured to control to color code items when displaying the items corresponding to the respective categories.

8. The information processing device of claim 1, wherein the processor is further configured to:
compute a degree of matching for a categorization result of the material component image; and
perform control to display material component images in the first image list arranged according to the degree of matching in either a best-match sequence or a worst-match sequence.

9. The information processing device of claim 1, wherein the processor is further configured to control to display an overview of measurement results for each of the categories, and to apply a mark indicating check completion to a category among categories displayed in the overview for which the first image list has been displayed and checking of material component images performed.

10. The information processing device of claim 1, wherein the processor is further configured to control to set an enlargement ratio of the material component images when being displayed in the first image list.

11. The information processing device of claim 1, wherein the processor is configured to control to set at least one of a brightness or a contrast ratio of the material component images when being displayed in the first image list.

12. The information processing device of claim 1, the memory is configured to store the categorized material component image and a reference image for the material component image, wherein the processor is further configured to:
perform control to add the re-categorized material component image as the reference image for the same category as the category of the material component image, such that, in a case in which an instruction to display the reference image has been received in a state in which a material component image list of material component images included in the category of the material component image is being displayed by the display section, in a subsequent state in which the material component image list and a reference image list of the reference images are being displayed at the same time by the display section, a material component image selected from the material component image list is copied into the reference image list.

13. A measurement system comprising:
a flow cell configured to allow a sheath fluid and a sample fluid containing a plurality of types of material components to flowthrough;
an imaging section configured to image the sample fluid flowing through the flow cell; and the information processing device of claim 1 configured to control on a plurality of images obtained by imaging with the imaging section.

14. An information processing device comprising:
a memory; and
a processor coupled to the memory;
the processor being configured to:
- extract a material component image identified as a material component from a plurality of images obtained by imaging a sample fluid containing a plurality of types of material component and flowing through a flow cell, and categorize the extracted material component image, serving as a detected component, by predetermined category;
- perform control to store the categorized material component image and a reference image for the material component image in the memory; and
- perform control to add a categorized material component image, serving as the detected component, as the reference image for the same category as the category of the detected component, such that, in a case in which an instruction to display the reference image has been received in a state in which a material component image list of material component images included in the category of the detected component is being displayed by a display section, in a subsequent state in which the material component image list and a reference image list of the reference images are being displayed at the same time by the display section, a material component image selected from the material component image list is copied into the reference image list.

15. The information processing device of claim 14, wherein the processor is further configured to as to perform control to emphasize display of the material component image copied from the material component image list into the reference image list.

16. The information processing device of claim 15, wherein the control to emphasize display is control to display the material component image at a top position of the reference image list.

17. The information processing device of claim 14, wherein:
the category of the detected component is designated as at least one of a main category item or a sub-category item that is a subdivision of the main category item; and
the processor is further configured to control to display the material component image in an image list of material component images included in the main category item in a case in which the main category item has been selected when selecting the detected component category, and to display the material component image in an image list of material component images included in the sub-category item in a case in which the sub-category item has been selected when selecting the detected component category.

18. The information processing device of claim 14, wherein the processor is further configured to control to switch display of each of the material component images in the first image list between a plurality of the material component images having different focal positions to each other in a depth direction of the flow cell.

19. The information processing device of claim 14, wherein the processor is further configured to control to color code items when displaying the items corresponding to the respective categories.

20. The information processing device of claim 14, wherein the processor is further configured to:
compute a degree of matching for a categorization result of the material component image; and
perform control to display material component images in the material component image list arranged according to the degree of matching in either a best-match sequence or a worst-match sequence.

21. The information processing device of claim 14, wherein the processor is further configured to control to set an enlargement ratio of the material component images when being displayed in the material component image list.

22. The information processing device of claim 14, wherein the processor is configured to control to set at least one of a brightness or a contrast ratio of the material component images when being displayed in the material component image list.

23. A non-transitory storage medium storing a program for causing a computer to execute processing for examining images taken from a biological sample, the processing comprising:
- receiving a plurality of images obtained by imaging a sample fluid using a camera while the sample fluid is flowing through a flow cell, the sample fluid containing a plurality of types of material components;
- identifying, from the plurality of images, segments of the images as detected material component images;
- extracting, from the plurality of images, the identified detected material component images;
- categorizing the extracted material component images by predetermined category, the category being at least one of type, size, shape of material components, or presence of a nucleus;
- displaying the categorized material component images as a single image list of material component images;
- receiving a first operator instruction to select a movement destination category into which an operator wishes to re-categorize a material component image from within the single image list;
- subsequently displaying a first image list and a second image list at the same time, the first image list comprising the material component images that have not been re-categorized, including the material component image that the operator wishes to re-categorize, the second image list corresponding to the selected movement destination category;
- receiving a second operator instruction to select the material component image in the first image list that the operator wishes to re-categorize; and
- moving the selected material component image from the first image list to the second image list, thereby causing the selected material component image to be re-categorized as being in the movement destination category.

* * * * *